(12) United States Patent
Boinet et al.

(10) Patent No.: US 12,736,702 B2
(45) Date of Patent: Sep. 15, 2026

(54) DEVICE AND METHOD FOR MONITORING A TARGET COMPONENT OR A SET OF TARGET COMPONENTS THROUGH ELECTRICAL TIME-DOMAIN OR FREQUENCY-DOMAIN REFLECTOMETRY

(71) Applicant: SAINT-GOBAIN CENTRE DE RECHERCHES ET D'ETUDES EUROPEEN, Courbevoie (FR)

(72) Inventors: Mickael Boinet, Cavaillon (FR); Vincent Gleize, Cavaillon (FR); Cédric Payan, Cavaillon (FR); Céline Skora, Cavaillon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 237 days.

(21) Appl. No.: 18/696,070

(22) PCT Filed: Sep. 29, 2022

(86) PCT No.: PCT/EP2022/077190
§ 371 (c)(1),
(2) Date: Mar. 27, 2024

(87) PCT Pub. No.: WO2023/052546
PCT Pub. Date: Apr. 6, 2023

(65) Prior Publication Data

US 2024/0393492 A1 Nov. 28, 2024

(30) Foreign Application Priority Data

Sep. 29, 2021 (FR) ...................................... 2110250

(51) Int. Cl.
*G01V 3/12* (2006.01)
*G01N 22/00* (2006.01)
*G01N 27/02* (2006.01)

(52) U.S. Cl.
CPC ............... *G01V 3/12* (2013.01); *G01N 22/00* (2013.01); *G01N 27/02* (2013.01)

(58) Field of Classification Search
CPC ........... G01V 3/12; G01N 22/00; G01N 27/02
(Continued)

(56) References Cited

U.S. PATENT DOCUMENTS 10,488,454 B2 11/2019 Ben Hassen et al.
2001/0007571 A1* 7/2001 Murphy ................ G01N 22/00 374/161

(Continued)

OTHER PUBLICATIONS

Zhu Chen et al. "Truly distributed coaxial cable sensing based on random 1. inhomogeneities" SPIE Proceedings; {Proceedings of SPIE ISSN 0277-786X], SPIE, US, vol. 11000, May 14, 2019 (May 14, 2019).

(Continued)

*Primary Examiner* — Raul J Rios Russo
(74) *Attorney, Agent, or Firm* — IPSILON USA, LLP

(57) ABSTRACT

A device for tracking a target component through electrical time-domain or frequency-domain reflectometry has an electromagnetic waveguide and an interrogator electrically connected to the waveguide in order to inject an incident signal therein and receive a reflected signal in response. The reflected signal has a background echo reflected by the exit end of the waveguide. The waveguide has a measuring part with a plurality of base discontinuities, distributed randomly along the measuring part of the waveguide, and that are able to generate echoes having an amplitude greater than 1% and less than 30% of the amplitude of the background echo.

42 Claims, 6 Drawing Sheets

(58) Field of Classification Search
USPC .......................................................... 324/642
See application file for complete search history.

(56) References Cited

U.S. PATENT DOCUMENTS

| | | | | | |
|---|---|---|---|---|---|
| 2010/0283459 | A1* | 11/2010 | Kruspe | G01R 33/3808 | 324/303 |
| 2010/0283460 | A1* | 11/2010 | Kruspe | G01V 3/32 | 324/303 |
| 2016/0041296 | A1* | 2/2016 | Ahmad | G01V 3/38 | 324/346 |
| 2016/0320519 | A1* | 11/2016 | Blanz | G01V 3/32 | |
| 2017/0108608 | A1* | 4/2017 | Chaney | G01V 3/02 | |

OTHER PUBLICATIONS

Topp G. C. et al. "Measurement of Soil Water Content using Time-domain Reflectrometry 40 (TDR): A Field Evaluation" Soil Science Society of America. Journal, US, vol. 49, No. 1, Jan. 1, 1985 (Jan. 1, 1985).

Stastny Jeffrey A. et al. "Distributed electrical time domain reflectometry (ETDR) structural sensors: design models and proof-of-concept experiments" Algorithms and Technologies for MU LT/Spectral, Hyperspectral, and Ultraspectral Imagery XIX—Proceedings of SPIE, US, vol. 1918, Jul. 12, 1993.

Baokai Cheng et al. "Distributed temperature sensing with unmodified coaxial cable based on random reflections in TDR signal" Measurement Science and Technology, /OP, Bristol, GB, vol. 30, No. 1, Dec. 13, 2018 (Dec. 13, 2018).

Dominauskas et al. "Electric time-domain reflectometry distributed flow sensor" Composites Part A, Elsevier, Amsterdam, NL, vol. 38, No. 1, Nov. 25, 2006 (Nov. 25, 2006).

International Search Report dated Jan. 5, 2023.

* cited by examiner

[Fig 1]
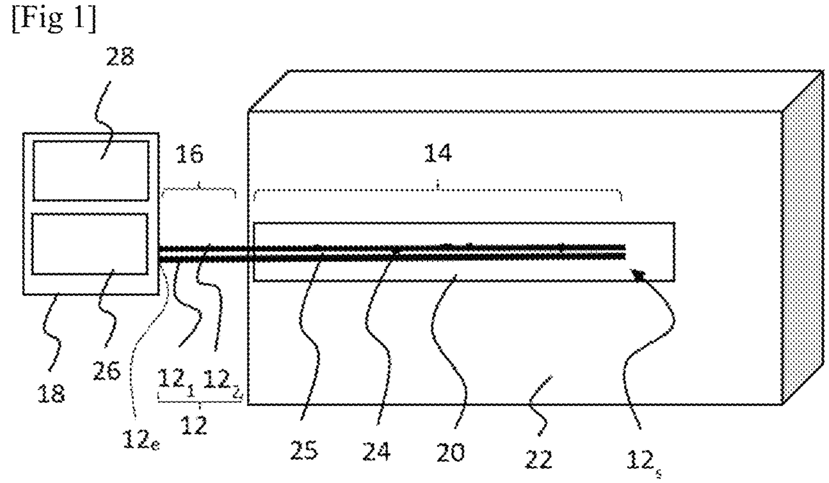
[Fig 2]
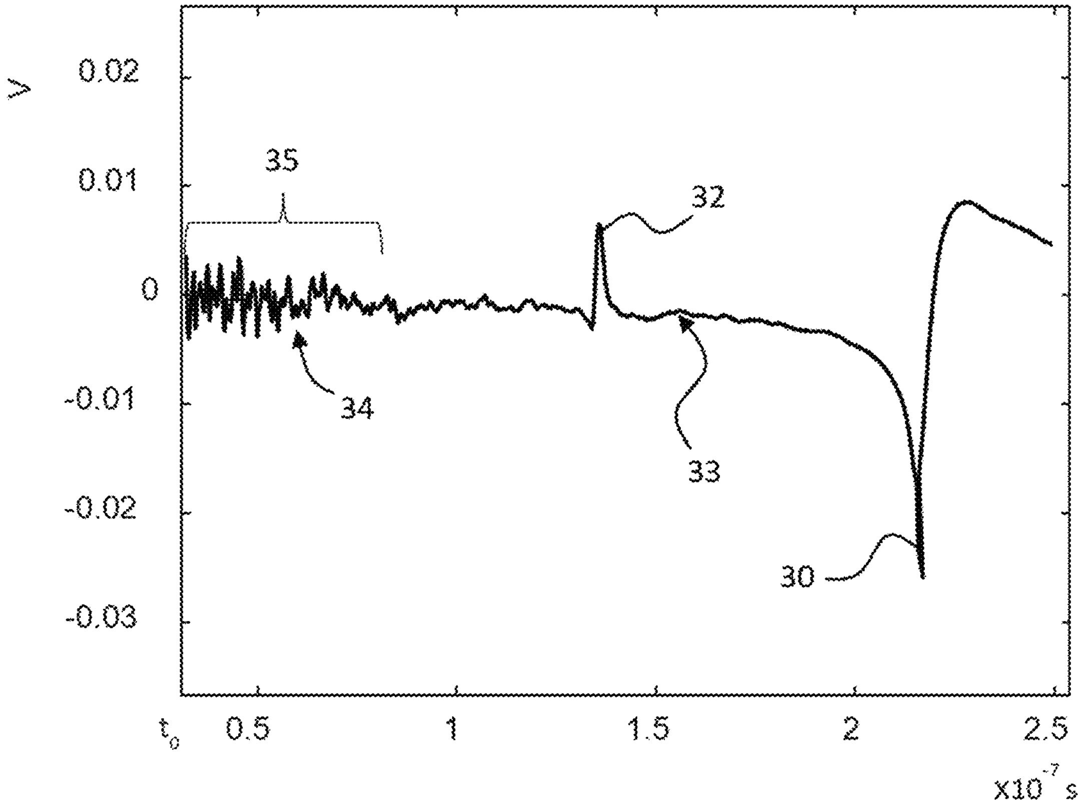

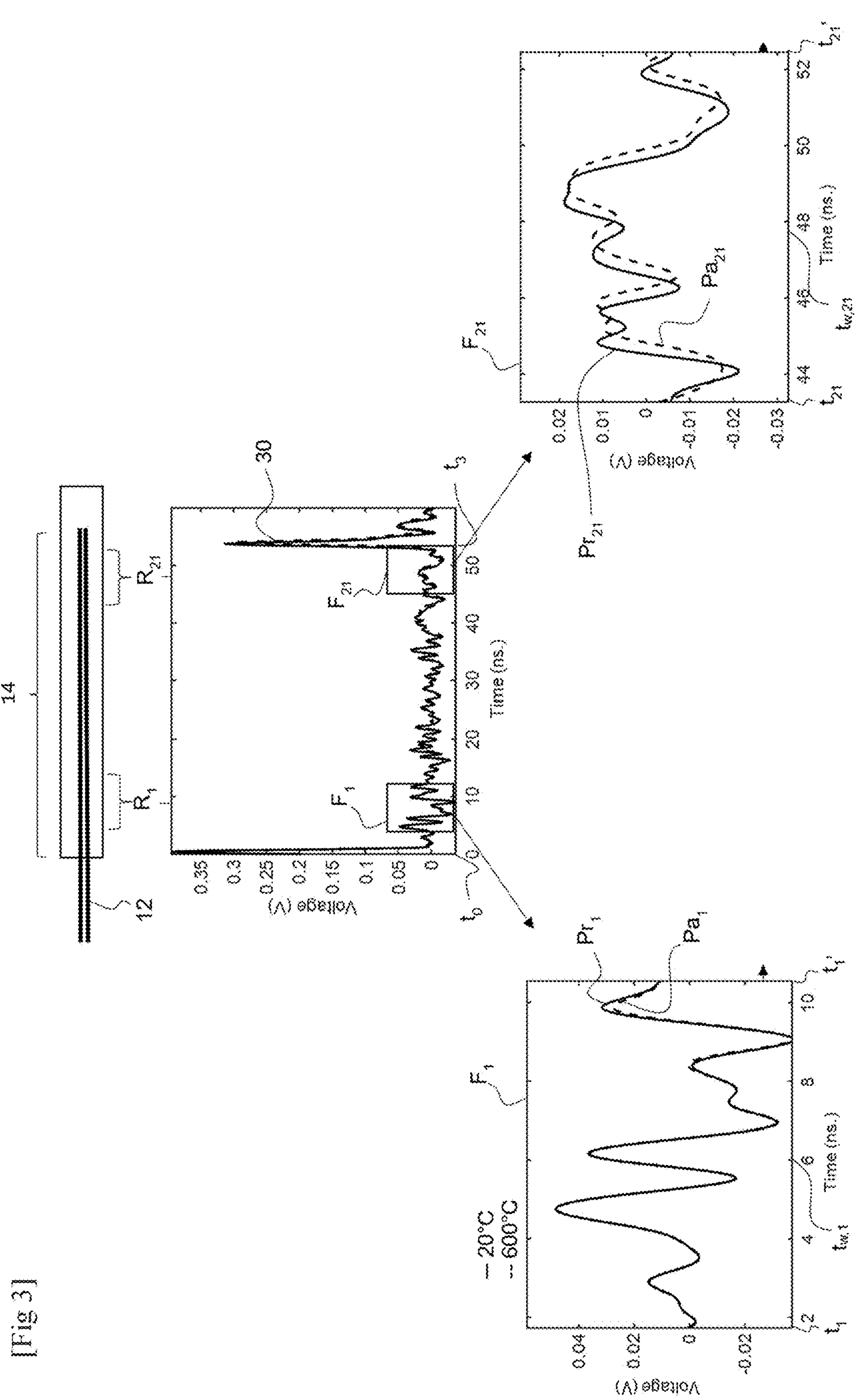
[Fig 3]
14
12
$R_1$
$R_{21}$
30
$F_1$
$F_{21}$
Voltage (V)
Time (ns.)
$t_0$
$t_3$
— 20°C
-- 600°C
$Pr_1$
$Pa_1$
$Pr_{21}$
$Pa_{21}$
$t_1$
$t_1'$
$t_{21}$
$t_{21}'$
$t_{w,1}$
$t_{w,21}$

[Fig 4]
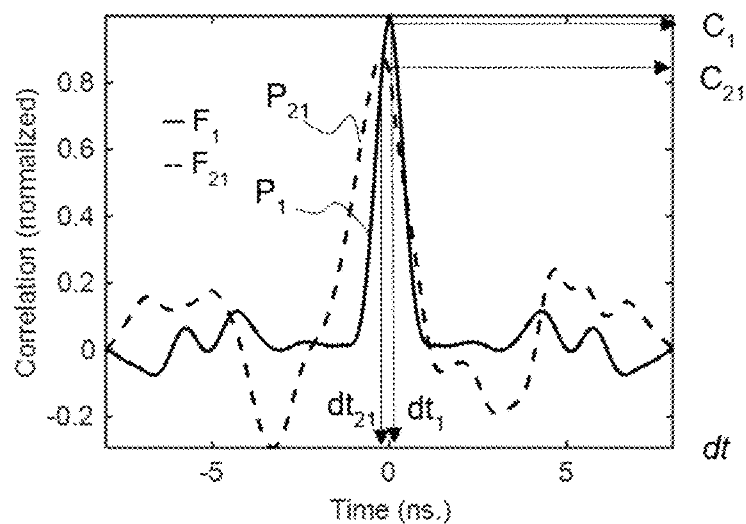
[Fig 5]
Z1 Z2 Z3 Z4 Z5
0
-0.1
-0.2
-0.3
-0.4
dV/V (%)
10 20 30 40 50
Time (ns.)
14
12
Z1 Z2 Z3 Z4 Z5

[Fig 6]
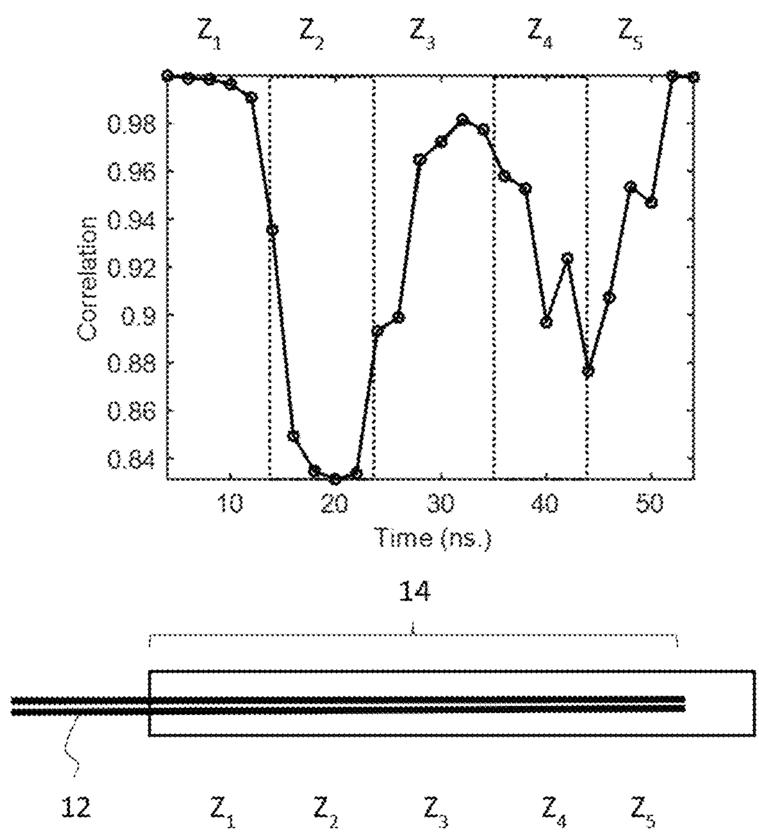

[Fig.7]
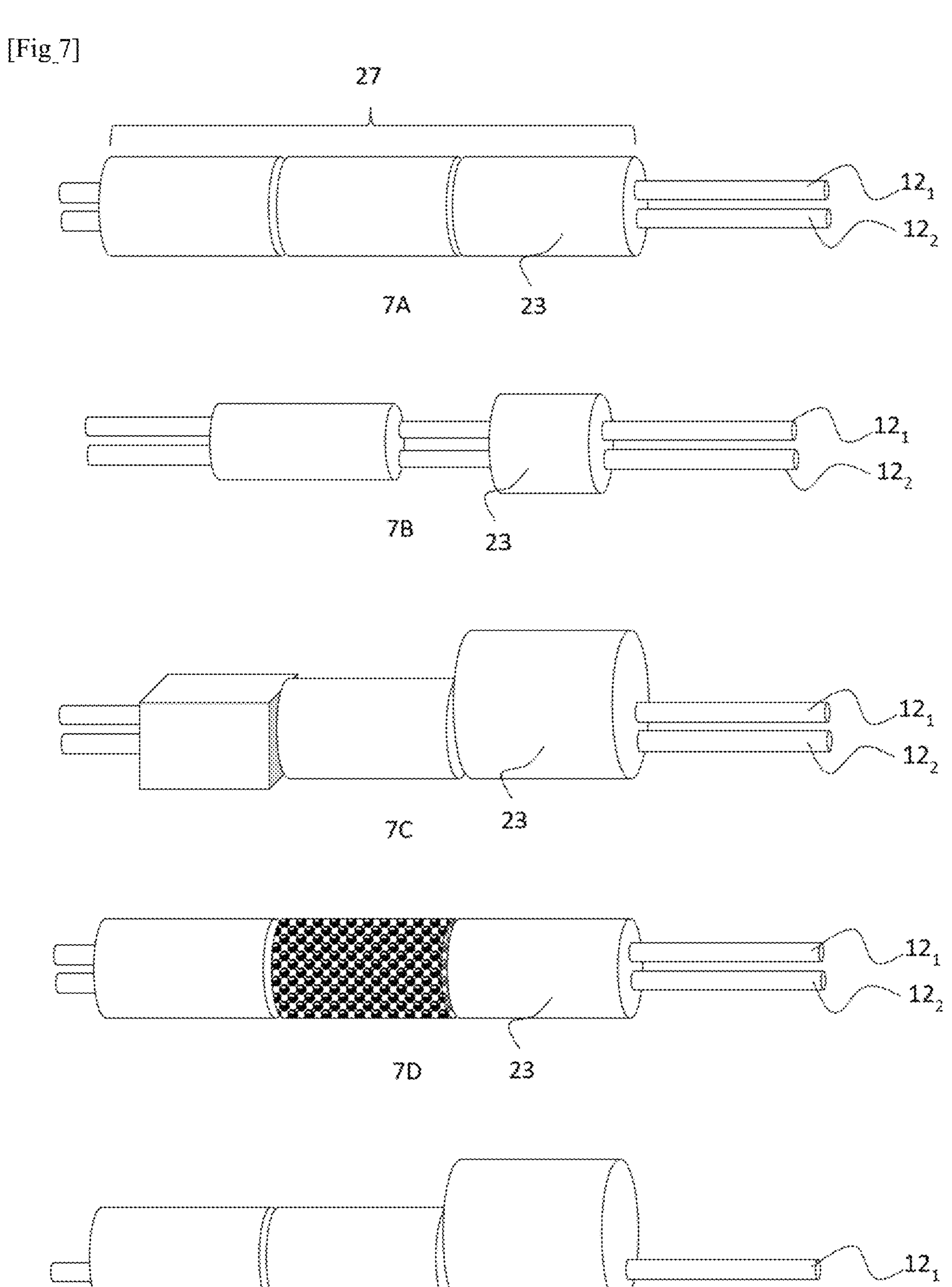

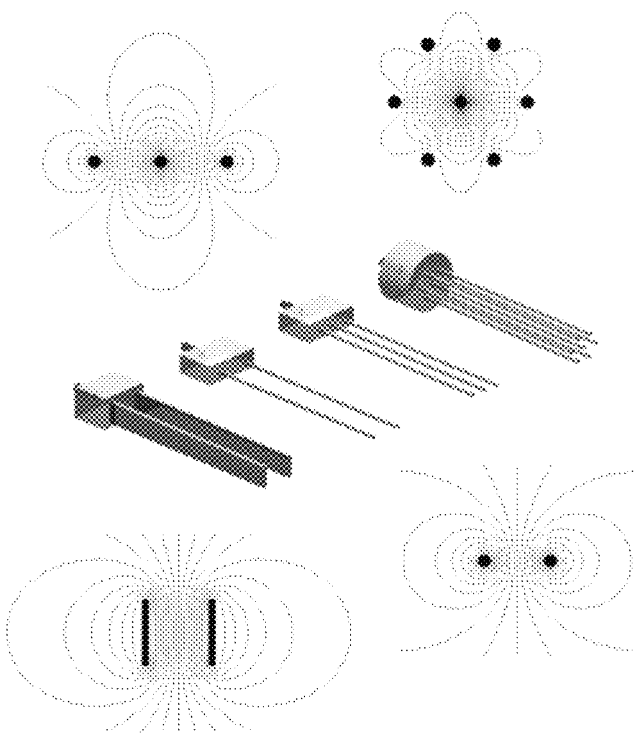
[Fig 8]

DEVICE AND METHOD FOR MONITORING A TARGET COMPONENT OR A SET OF TARGET COMPONENTS THROUGH ELECTRICAL TIME-DOMAIN OR FREQUENCY-DOMAIN REFLECTOMETRY

RELATED APPLICATION

This application is a National Phase of PCT/EP2022/077190 filed on Sep. 29, 2022, which claims the benefit of priority from French Patent Application No. 21 10250 filed on Sep. 29, 2021, the entirety of which are incorporated by reference.

TECHNICAL FIELD

The invention relates to a method and a device for monitoring a target component by electrical reflectometry. It also relates to a method for manufacturing such a monitoring device and to an installation comprising such a monitoring device.

PRIOR ART

Reading temperatures at different locations of a target component allows the state thereof to be controlled, in particular for detecting hot spots corresponding to thermal bridges or for detecting the appearance of cracks.

In environments at temperatures of more than 100° C., this reading is conventionally carried out by means of thermocouples. However, implementing thermocouples takes a long time and does not allow continuous monitoring with a high density of measurement points.

Alternatively, the temperatures are measured by infrared thermography. However, infrared thermography is only possible at locations that are visually accessible by an infrared camera.

Moreover, the use of thermocouples or of infrared thermography does not allow any modifications in the physical state of the part to be detected. A second array of sensors therefore must be installed to this end.

More generally, a requirement exists for a solution that facilitates reading different types of measurements at numerous points of an environment, in particular reading the temperature and/or the physical state of a target component or of a set of large target components, and allowing continuous and precise monitoring of any evolutions in these measurements.

An aim of the invention is to at least partially address this requirement.

SUMMARY OF THE INVENTION

The invention proposes a method for determining a property of an environment in an "updated" situation, said method comprising the following steps:

a) introducing an electromagnetic waveguide into said environment comprising, between input and output ends of said waveguide, a measurement part comprising a plurality of discontinuities; then in a reference situation of said environment:

b1) injecting an incident signal via said input end at a "reference" instant;

c1) receiving a signal, or "reference reflected signal", reflected by the waveguide in response to said injection;

and in the updated situation of said environment:

b2) injecting an incident signal identical to that injected in step b1) via said input end at an "updated" instant;

c2) receiving a signal, or "updated reflected signal", reflected by the waveguide in response to said injection;

d) analyzing the reference and updated reflected signals so as to determine said property of said environment in the updated situation;

e) optionally, preferably transmitting a message relating to said property or to an evolution of said property relative to a situation prior to the updated instant;

step d) comprising the following steps:

1) determining an intercorrelation function between:
   - a "reference" portion of the reference reflected signal; and
   - an "updated" portion of the updated reflected signal;

with the reference and updated portions being portions of the reference and updated reflected signals, respectively, delimited by the same measurement window, centered on an instant, called "window position", defined relative to the start of the reference and updated reflected signals, with the maximum of the intercorrelation function, or "maximum correlation", being obtained for a phase shift, called "main phase shift" (in other words, the value of said intercorrelation function, or "correlation", as a function of time, or "phase shift", defines a main peak (the highest peak), the height of which defines the "maximum correlation", with the main peak being centered on the "main phase shift");

2) determining, based on the main phase shift and/or the maximum correlation, a correlation index; and 3) determining, based on said correlation index, a value of said property in the updated situation and/or an evolution of said value of said property.

An electromagnetic waveguide is a waveguide having the general shape of a transmission line, adapted to an electrical time-domain or frequency-domain reflectometry measurement. It conventionally comprises first and second electrical conductors electrically insulated from one another, preferably spaced apart by a dielectric material, and which extend in the lengthwise direction of the waveguide.

The incident signal is conventionally a variation in potential difference between said electrical conductors. The incident signal is injected at the input end of the waveguide, then propagates in the form of an electromagnetic wave. A variation in electrical impedance causes a partial reflection of this wave.

The reflected signal is also a temporal variation in potential difference between the electrical conductors.

The term "echo" refers to the part of a reflected signal that is returned by a discontinuity (secondary echo), via the input end of the waveguide (emission echo) or via the output end of the waveguide (back echo). A secondary echo is thus a response of a discontinuity to the incident signal.

Depending on the amplitude of the secondary echoes, a distinction is made between "noise" secondary echoes, "base" secondary echoes and "direct" secondary echoes.

Noise secondary echoes are the secondary echoes with an amplitude that is less than or equal to 1% of the amplitude of the back echo and is greater than 0.1% of the amplitude of the back echo. They are conventionally generated by "noise" discontinuities resulting from imperfections in the waveguide that are particularly generated when manufacturing the waveguide.

Since noise secondary echoes have a low amplitude, they are therefore attenuated very quickly. In many cases, they do not allow precise monitoring of any measurement evolutions to be carried out, for example, when the temperature increases or when moisture content is high.

Base secondary echoes are the secondary echoes with an amplitude that is greater than 1% and less than 30% of the amplitude of the back echo. They are generated by "base" discontinuities, conventionally resulting from voluntary modifications applied to the waveguide, for example, by texturing or adding beads, as described hereafter.

The amplitude of base secondary echoes can be greater than 2%, 3%, or 5%, or even 10% of the amplitude of the back echo reflected by the output end of the waveguide.

The analysis of step d) allows any disturbances or modifications of the environment to be detected and identified over the entire length of the measurement part of the waveguide.

Direct secondary echoes are secondary echoes with an amplitude that is greater than or equal to 30% of the amplitude of the back echo. They are generally isolated and generated by "direct" discontinuities, conventionally resulting from a significant or abrupt variation of the structure of the waveguide, for example, resulting from an unintentional degradation of the waveguide, for example, by cracking. Such local, direct discontinuities do not allow, by analyzing direct secondary echoes, disturbances or modifications of the environment to be measured other than at the locations of the direct discontinuities. They therefore do not allow measurement variations to be located over the entire length of the measurement part.

As shown in FIG. 2, the noise 33 and base 35 secondary echoes are particularly distinguished from a direct secondary echo 32 (isolated peak of the reflected signal).

Preferably, said property is selected from among:

- the temperature of the environment;
- information relating to the physical state of the environment, for example, relating to the moisture content or to the pressure in said environment;
- information relating to the chemical composition of the environment, for example, relating to an alkaline constituent content or to a CO content.

Preferably, the environment is at least partially made up of a target component.

Preferably, the environment is at a temperature of more than 125° C., or at a temperature of more than 400° C.

In one embodiment, the environment comprises a refractory material, or it is even made up of a refractory material.

Preferably, the waveguide is in contact with, preferably applied to, the target component, preferably fixed, for example, adhered, to the target component, or embedded in the target component, for example, in refractory concrete. It can therefore enter the target component or remain outside the target component.

Preferably, the waveguide comprises first and second electrical conductors electrically insulated from each other by a dielectric material and, before step a), the waveguide is modified, for example, by texturing the outer surface of the waveguide and/or of the dielectric material and/or of at least one of the first and second electrical conductors, for example, by abrasion and/or chemical etching, or by uneven segmentation of the dielectric material, for example, by threading beads onto one or both of the electrical conductors, so as to create said discontinuities, preferably base discontinuities.

Preferably, base discontinuities are randomly distributed at least along the measurement part of the waveguide, or even along the entire length of the waveguide.

Advantageously, the random distribution avoids interference resonance phenomena.

The correlation index of the intercorrelation function is preferably the maximum correlation or the main phase shift of this function, or any function of the maximum correlation and/or of the main phase shift. Other correlation indices nevertheless can be contemplated.

In one embodiment, in step 3), the value of said property and/or said evolution of said value of said property is evaluated by means of a correspondence table establishing a relationship between:

- said value and/or said evolution; and
- said correlation index.

Preferably, the cycle of steps 1) to 3) is repeated by modifying the position of the measurement window each time, preferably while preserving the same duration for the measurement window, preferably so as to scan at least the entire measurement part of the waveguide in contact with said environment. The correlation index particularly can be the maximum correlation. Advantageously, it is thus possible to locally monitor said property throughout the measurement part of the waveguide.

In One Embodiment,

- first and second cycles of steps 1) to 2) are carried out, with first and second positions of the measurement window, respectively, preferably while preserving the same duration for the measurement window, so as to determine first and second correlation indices, in particular first and second maximum correlations or first and second normalized phase shifts, defined hereafter, respectively; then
- in step 3), a difference is determined between the first and second correlation indices, or a function of said difference is determined, for example, a gradient of said correlation index between the first and second positions of the measurement window, in particular a gradient for the normalized phase shift; then
- based on said difference or said function of said difference, the value of said property in the updated situation and/or the evolution of said value of said property is/are determined.

Preferably, said second cycle is repeated by modifying the position of the second measurement window each time, preferably while preserving the same duration for the measurement window, preferably so as to scan at least the entire measurement part of the waveguide in contact with said environment. Advantageously, it is thus possible to locally monitor said property throughout the measurement part of the waveguide.

According to a first preferred main aspect, the correlation index is a function of the ratio between the main phase shift and the position of the measurement window, on which the measurement window is centered. The correlation index is preferably the ratio of the main phase shift to the position of the measurement window, or a derivative of said ratio.

As will be seen in further detail throughout the remainder of the description, this normalization advantageously allows information to be determined concerning the temperature upstream of the measurement window, without a calibration step.

Preferably, steps 1) and 2) are implemented for several successive positions of the measurement window so as to search for a portion of the reflected and reference signals in which said ratio, or "normalized phase shift", evolves with the position of the measurement window. It is thus possible to deduce, in step 4), the existence of a temperature difference between the reference situation and the updated situation in a region of the waveguide corresponding to said portion. This difference can be measured by means of an experimentally defined correspondence table, associating evolutions in normalized phase shifts and differences in temperature between the reference situation and the updated situation.

In one embodiment, the correlation index is the derivative of the normalized phase shift relative to the position of the measurement window, or, equivalently, of a gradient of this normalized phase shift relative to the position along the waveguide. The derivative has the advantage of immediately providing information concerning the local evolution of the property between the reference situation and the updated situation in the region that corresponds to the position of the measurement window.

Preferably, no position of the measurement window is less than one meter, preferably less than 5 meters, from the input end of the waveguide. The measurement part of the waveguide is thus preceded by a "dead" part, which improves the precision of the measurements, in particular measurements carried out based on the normalized phase shift.

In one embodiment, said property is a temperature or a moisture content of the environment, and is determined, for example, by means of a correspondence table, as a function, preferably exclusively as a function, of the main phase shift or a function of the main phase shift, preferably as a function of the ratio of the main phase shift to the position of the measurement window.

In one embodiment, said property relates to a physical state of the environment, for example, to the presence of cracks or to delamination, acts on the shape of the waveguide and is determined, for example, by means of a correspondence table, as a function, preferably exclusively as a function, of the maximum correlation. For example, said property acts on the distance between said first and second electrical conductors and/or on the arrangement of dielectric beads disposed along the waveguide.

In one embodiment, more than 80%, more than 90%, more than 95%, or even substantially 100% of the reference and updated portions represent noise secondary echoes. This embodiment is not preferred, since the noise secondary echoes are attenuated very quickly and do not allow precise monitoring to be carried out of significant evolutions in temperature. The use of base secondary echoes is preferred.

The succession of noise and/or base secondary echoes preferably produces a temporal or frequency variation in potential that is aperiodic or irregular. The aperiodic variations of these echoes are generally considered to be detrimental. However, they are useful for evaluating the property of an environment at multiple points: indeed, these echoes do not substantially impede the propagation of the incident signal.

Thus, it is advantageously possible to multiply the measurement points throughout the waveguide in order to gather a host of useful information concerning the environment.

According to a second preferred main aspect, at least some of the echoes of the reference and updated portions have an amplitude that is more than 1% and less than 30% of the amplitude of the back echo reflected by the output end of the waveguide.

The reliability of the measurement is advantageously greater than that resulting from an analysis of the noise secondary echoes.

The base secondary echoes conventionally result from base discontinuities voluntarily added to the waveguide. Therefore, it is advantageously possible to select particular regions in which the base secondary echoes are added. By marking these regions, for example, by coloring them in a specific manner, it is thus possible for them to be easily identified. This simplifies mounting the waveguide in its environment.

Preferably, the base discontinuities are exclusively added in one or more regions of the waveguide, but not along the entire length of the waveguide. Advantageously, the regions of the waveguide that are not used for the measurement may not comprise base discontinuities, which limits the attenuation of the incident signal passing through the waveguide. Advantageously, such a distribution of the base discontinuities allows greater lengths to be provided for the waveguide.

Preferably, in step d), the measurement window and its position are determined so that more than 80%, more than 90%, more than 95%, or even substantially 100%, of the reference and updated portions represents secondary echoes whose amplitude is greater than 1%, than 2%, than 3%, than 5%, or even than 10% and/or less than 30% of the amplitude of the back echo reflected by the output end of the waveguide. In other words, the base portion and the updated portion are preferably made up of said secondary echoes for more than 80%, more than 90%, more than 95%, or even substantially 100% of their lengths.

Preferably, more than 80%, more than 90%, more than 95%, or even substantially 100% of said secondary echoes are generated by discontinuities resulting:

- from texturing the outer surface of the waveguide and/or at least one electrical conductor of the waveguide, in particular when the waveguide comprises said first and second electrical conductors in the form of parallel cables;

and/or

- from the presence of one or more dielectric blocks disposed along the waveguide, preferably in the form of beads.

Preferably, the dielectric blocks are beads that are threaded end-to-end along the waveguide so as to together form a segmented protective sheath.

Preferably, in step d), the measurement window and the position of the measurement window are determined so that the secondary echoes of the reference and updated portions, preferably at least the base secondary echoes of the reference and updated portions, have randomly variable amplitudes and/or shapes and/or so that said echoes are randomly distributed in the measurement window, i.e., in the reference and updated portions. Advantageously, the risk of an error when analyzing the reference and updated portions is limited.

Preferably, in step d), a measurement window is determined so that the ratio of the average amplitude of the noise and base secondary echoes of the reference and updated portions in the measurement window to the amplitude of the back echo is greater than 2%, 3%, 5%, or even 10%.

Preferably, the ratio of the average amplitude of the noise and base secondary echoes of the reference and updated portions to the amplitude of the back echo is less than 50%, preferably less than 40%, preferably less than 30%, or even less than 20%. Such a ratio promotes the sensitivity of the measurement.

In one embodiment, more than 80%, more than 90%, more than 95%, or even substantially 100% of the reference and updated portions represents noise secondary echoes. Preferably, more than 80%, more than 90%, more than 95%, or even substantially 100% of the reference and updated portions represent base secondary echoes.

The succession of the noise and/or base secondary echoes preferably produces a temporal or frequency variation in potential that is aperiodic or irregular. The aperiodic variations of these echoes are generally considered to be detrimental and the inventors are to be credited for having discovered that these variations can be useful for evaluating the property of an environment at multiples points: indeed, these echoes do not substantially impede the propagation of the incident signal. Advantageously, it is thus possible to multiply the measurement points throughout the waveguide in order to gather a host of useful information concerning the environment.

According to a third preferred main aspect, the waveguide is configured to

- withstand, and in particular not to melt, even partially, a temperature of more than 100° C., of more than 125° C., of more than 150° C., of more than 200° C., of more than 300° C., of more than 400° C., and/or of less than 2,000° C. or less than 1,000° C.; and/or
- withstand an environment, in particular a gaseous environment, that is:
  - highly oxidizing, for example, an atmosphere containing a halogen, for example, fluorine and/or chlorine, and/or an alkali, for example, more than 1% of said halogen and/or of said alkali; or
  - highly reducing, for example, an atmosphere containing hydrogen and/or carbon monoxide, for example, more than 1% or more than 5% of hydrogen and/or carbon monoxide.

Preferably, the waveguide is devoid of material with a melting temperature of less than 500° C., than 400° C., than 300° C., than 200° C. or than 100° C., preferably devoid of material with a melting temperature lower than the temperature of the environment.

Preferably, the waveguide does not include polymer.

In one embodiment, in the updated situation and/or in the reference situation, said environment is at a temperature of more than 125° C., or even of more than 300° C., and the waveguide is configured so as not to melt, even partially, at the temperature of the environment.

Preferably, the waveguide is not a coaxial cable. Preferably, the waveguide comprises first and second electrical conductors in the form of parallel cables, electrically insulated from each other by a dielectric material, preferably by means of spacers, for example, beads.

According to a fourth preferred main aspect, in step 2), the maximum correlation is determined and, in step 3), a modification of the environment of the waveguide or a deformation of the waveguide is determined, in the region corresponding to the measurement window, as a function of the maximum correlation.

The maximum correlation has the advantage of providing information concerning the evolution of the shape of the waveguide and/or of the property of the environment around the waveguide, between the reference situation and the updated situation in the region that corresponds to the position of the measurement window. In order to locate the deformation or the evolution of the property of the environment, the waveguide therefore does not need to be scanned, i.e., steps 1) and 2) do not need to be implemented, for a succession of positions of the measurement window.

However, such scanning is useful for determining the deformations throughout the waveguide, as illustrated in FIG. 6.

The detection and evaluation of a deformation of the waveguide advantageously allows the appearance of cracks, or, more generally, of a deformation in the environment to be detected and evaluated.

The maximum correlation can be used to evaluate a modification of the environment of the waveguide, even when the waveguide does not deform. For example, it can be used if the blocks or the sheath of the waveguide are made of a material with a thermal expansion coefficient close to 0, for example, made of cordierite, in an environment in which the temperature varies significantly.

The use of the maximum correlation and of the normalized phase shift as correlation indices advantageously allows, based on the same updated reflected signal:

- based on the analysis of the normalized phase shift, modifications of properties of the environment to be determined that have acted on the propagation speed of the incident signal along the waveguide, such as the temperature or the chemical composition or the nature of the phases (liquid, solid or gas), or even the nature of the crystallographic phases of the environment; but also
- based on the analysis of the maximum correlation, modifications of properties of the environment to be determined that are expressed by a deformation of the environment around the waveguide and/or that have acted on the deformation of the waveguide, such as the appearance of mechanical stresses, resulting, for example, from pressures and generating, for example, cracks or delamination.

According to a fifth preferred main aspect, the waveguide comprises two non-coaxial electrically conductive cables, preferably made of metal, preferably separated by a dielectric material.

The lack of coaxiality facilitates the arrangement of the base discontinuities, notably for the arrangement and the geometry of a dielectric material.

Preferably, the cables are parallel.

The use of such a waveguide is advantageously reliable, efficient, and inexpensive.

Each cable can be made up of a single wire or of several wires, for example, braided wires.

According to a sixth main aspect, in one embodiment, the waveguide comprises two electrically conductive cables, which are preferably non-coaxial, preferably metallic, preferably separated by a dielectric material, with the spacing between said cables being locally variable, along the length of the waveguide, so as to define discontinuities, preferably base discontinuities, preferably in a random manner.

According to a seventh main aspect, in one embodiment, the waveguide comprises more than two of said conductors, preferably three, four, five or six conductors that extend parallel, preferably in the form of wires:

- with a first part of the conductors being connected to the interrogator, at the input end of the waveguide, so as to be at a first electrical potential; and
- with a second part of the conductors being connected to the interrogator, at the input end of the waveguide, so as to be at a second electrical potential different from the first electrical potential.

Preferably, the first part of the conductors is made up of a "central" conductor and the second part of the conductors is made up of several "lateral" conductors, preferably more than two, more than three, more than four or more than five and/or less than 50 lateral conductors, extending along the central conductor, with the lateral conductors preferably being equi-angularly distributed around the central conductor.

Advantageously, the field lines thus can be concentrated in the vicinity of the central conductor, which allows the measurement to be concentrated in the vicinity of the central conductor.

Of course, the features of the various main aspects can be combined.

They are preferably combined.

The invention also relates to a device for monitoring a target component or a set of target components by electrical time-domain or frequency-domain reflectometry, said device comprising:

an electromagnetic waveguide comprising, between input and output ends of said waveguide, a measurement part comprising a plurality of discontinuities, i.e., local modifications capable of partially reflecting a signal circulating in the waveguide, in the form of a secondary echo;

an interrogator electrically connected to the input end of the waveguide and preferably configured so as to implement steps b1), b2), c1), c2), d), and preferably e), of a determination method according to the invention.

The electromagnetic waveguide preferably has one or more of the features described above for the various main aspects.

Preferably, the measurement part comprises a plurality of discontinuities, called "base discontinuities", capable of generating base secondary echoes.

The base discontinuities are preferably distributed, preferably randomly, at least along the measurement part of the waveguide, preferably over the entire length of the measurement part.

The measurement part can extend over the entire length or over only part of the length of the waveguide. In particular, it can extend over less than 90%, less than 80%, less than 70%, less than 60%, and/or more than 10% of the length of the waveguide.

Preferably, the waveguide only comprises base discontinuities in one or more "base" regions of the waveguide, but not over the entire length of the waveguide. The cumulative length of the base regions preferably represents more than 10%, preferably more than 20%, preferably more than 40%, preferably more than 50%, and/or less than 90%, less than 80% or less than 70% of the length of the waveguide.

The use of a waveguide generating secondary echoes with low amplitudes and/or generating base secondary echoes only over a fraction of its length advantageously limits the attenuation of the incident signal. Therefore, long waveguides can be used.

Preferably, the waveguide is marked so as to identify the measurement part or the base regions. In other words, it bears one or more marks allowing an operator to identify the measurement part or these base regions simply by visually observing the waveguide.

Preferably, the waveguide comprises:

first and second electrical conductors, preferably in the form of cables, that extend in the lengthwise direction of the waveguide; and one or more dielectric blocks disposed so as to generate said base secondary echoes.

The one or more blocks are preferably disposed at less than 1 mm from the first and/or second electrical conductor, preferably in contact with the first electrical conductor and/or the second electrical conductor.

The one or more blocks are preferably spacers made of a dielectric material, disposed so as to keep the first electrical conductor at a distance from the second electrical conductor.

Preferably, the one or more blocks are beads, preferably of generally cylindrical shape, preferably with a circular base, threaded onto the first electrical conductor and/or onto the second electrical conductor.

In one embodiment, the one or more blocks are movable relative to the first electrical conductor and/or to the second electrical conductor.

In one embodiment, the waveguide comprises a sheath for protecting the first and second electrical conductors. Preferably, the protective sheath is segmented, preferably made up of a plurality of blocks set end-to-end. It can result, for example, in a thread with a host of beads.

Preferably, the one or more blocks are made of a thermally and electrically insulating material.

The thermally insulating material preferably has thermal conductivity of less than 30 W/m·K, less than 20 W/m·K, less than 10 W/m. K, or even less than 5 W/m·K, at a temperature ranging between 20 and 1,000° C.

Preferably, the one or more blocks have a melting point of more than 300° C., of more than 500° C., or of more than 1,000° C., and preferably are made of a material selected from mica, mica derivatives, titanium, barium, mullite, cordierite and alumina.

In one embodiment, the discontinuities are obtained by texturing, which may or may not be random, the dielectric material or at least one of the electrical conductors, for example, by abrasion and/or chemical etching, or by uneven segmentation of the dielectric material.

Preferably, the discontinuities generated by the texturing generate more than 80% of said base secondary echoes.

Preferably, the waveguide comprises two non-coaxial electrically conductive cables.

Preferably, the waveguide complies with the Rayleigh scattering condition.

Preferably, said base discontinuities are spaced apart from each other by a distance, measured along the waveguide, that is at least 20 times less than the wavelength equal to the propagation speed of the incident signal divided by the frequency of the highest peak of the frequency spectrum of the incident signal.

Preferably, the interrogator is configured so as to implement said steps b1), b2), c1), and c2), a step d'), and preferably a step e), as follows:

b1) injecting an incident signal via said input end at a "reference" instant;

c1) receiving a signal, or "reference reflected signal", reflected by the waveguide in response to said injection;

b2) injecting an incident signal identical to that injected in step b1) via said input end at an "updated" instant;

c2) receiving a signal, or "updated reflected signal", reflected by the waveguide in response to said injection;

d) analyzing the reference and updated reflected signals so as to determine said property of said environment in the updated situation;

e) transmitting a message relating to said property or to an evolution of said property relative to a situation prior to the updated instant.

Step d') is preferably a step d), but is not limited to a step d).

It can implement any coda wave interferometry method, and/or a stretching method and/or a signal processing algorithm, called "DTW" or "Dynamic Time Warping".

Step d') preferably comprises one or more of the preferred features of step d). Thus, in one embodiment, step d') comprises the following steps of step d):

1) determining an intercorrelation function between:

a “reference” portion of the reference reflected signal; and an “updated” portion of the updated reflected signal;

with the reference and updated portions being portions of the reference and updated reflected signals, respectively, delimited by the same measurement window, centered on an instant, called “window position”, defined relative to the start of the reference and updated reflected signals;

with the maximum of the intercorrelation function, or “maximum correlation”, being obtained for a phase shift called “main phase shift”;

2) determining, based on the main phase shift and/or the maximum correlation, a correlation index; and 3) determining, based on said correlation index, a value of said property in the updated situation and/or an evolution of said value of said property;

with the measurement window being selected so that at least some of the echoes of the reference and updated portions are base secondary echoes.

Preferably, step d') then comprises the following preferred features:

the measurement window and the position of the measurement window are determined so that more than 80% of the reference portion and more than 80% of the updated portion represent said base secondary echoes;

the measurement window and the position of the measurement window are determined so that the base secondary echoes of the reference and updated portions have randomly variable amplitudes and/or shapes;

the measurement window and the position of the measurement window are determined so that the base secondary echoes of the reference and updated portions are randomly distributed in the measurement window;

the correlation index preferably is a function of the ratio of the main phase shift to the position of the measurement window;

the interrogator is configured to implement steps 1) and 2) for several successive positions of the measurement window so as to search for a portion of the reflected and reference signals in which said ratio evolves with the position of the measurement window;

no position of the measurement window is less than one meter from the input end of the waveguide;

no position of the measurement window is less than 5 meters from the input end of the waveguide;

in step 3), the value of said property and/or said evolution of said value of said property is determined by means of a correspondence table establishing a relationship between:

said value and/or said evolution; and said correlation index;

the cycle of steps 1) to 3) is repeated by modifying the position of the measurement window each time;

first and second cycles of steps 1) to 2) are carried out, with first and second positions of the measurement window, respectively, so as to determine first and second correlation indices, respectively; then in step 3), a difference is determined between the first and second correlation indices, or a function of said difference; then the value of said property in the updated situation and/or the evolution of said value of said property is determined based on said difference or said function of said difference;

the duration of the measurement window is greater than a reference period and less than 6 reference periods, with the reference period being the period corresponding to the frequency of the highest peak of the frequency spectrum of the reflected reference signal.

The invention also relates to a method for manufacturing a monitoring device according to the invention, in which method said waveguide is manufactured:

by disposing first and second electrical conductors, preferably metal cables, substantially parallel to each other; then by locally modifying the impedance of at least one of said electrical conductors by creating a plurality of discontinuities, preferably with random shapes and preferably randomly distributed, preferably with more than 10, preferably more than 40, more than 60, more than 100, or even more than 1,000 of said discontinuities per meter along the length of the waveguide.

Said discontinuities are preferably base discontinuities.

Preferably, the impedance is locally modified:

by locally modifying the relative position of the second electrical conductor relative to the first electrical conductor; and/or by disposing one or more dielectric blocks against at least one of said first and second electrical conductors, for example, by locally inserting a dielectric insulator between said first and second electrical conductors; and/or by locally modifying the texture of the first electrical conductor and/or of the second electrical conductor and/or of a dielectric insulator disposed between said first and second electrical conductors.

In one embodiment, the impedance is locally modified by threading identical or different beads, preferably different beads, made of a dielectric material onto the first conductor and/or the second conductor, preferably until a segmented protective sheath is formed.

Preferably, the one or more parts of the waveguide in which said discontinuities have been created, or the measurement part, are marked, for example, by externally coating them with a specific color, so as to locate them along the waveguide by visually observing said waveguide. This facilitates setting the waveguide to its service position. Furthermore, it is no longer necessary to have the back echo in order to determine the position of the discontinuities along the waveguide. Finally, the risk of incorrect location of the discontinuities if the back echo moves, for example, due to isolation of the waveguide or a short-circuit, is advantageously eliminated.

The invention also relates to an installation comprising:

a monitoring device according to the invention; and a target made up of a target component or of a set of target components, on which, or in which, the measurement part of the waveguide is disposed, preferably fixed, in a “service” position.

In one embodiment, the monitoring device is used to detect a modification of the shape of the target, for example, resulting from the appearance of a crack or delamination. The waveguide is then fixed so as to be deformed under the effect of the modification of the shape of the target.

Preferably, the waveguide comprises said first and second electrical conductors that extend in the lengthwise direction of the waveguide and are fixed on first and second parts of the target, respectively, for example, on adjacent first and second target components. Monitoring the maximum correlation then allows a space to be detected between these first and second parts of the target.

The deformation of the waveguide can also result in a modification of the position of one or more dielectric spacers along the waveguide. For example, one or more dielectric spacers can be movably mounted, for example, by translation movement, on one or more of the first and second electrical conductors. The waveguide then can be assembled on the target so that said deformation of the waveguide modifies the position of the one or more dielectric spacers on the waveguide. For example, a spacer can be fixed on the first part of the target and the electrical conductors can be fixed on the second part of the target.

Preferably, said target component, or even the target of the installation, is a reference part that is made of a ceramic material or of a cermet, preferably selected from the group made up of:

- a part of a heat exchanger;
- a part of a solar absorber;
- a tile or a protective part of a combustion turbine chamber;
- a tile of an incinerator;
- a shell for protecting a heater tube of an incinerator;
- a nozzle lining part;
- a part of a refractory lining of a reactor for manufacturing carbon black;
- a lining layer of a molten metal transfer ladle;
- a part or a lining layer of a cement furnace, notably a rotary kiln;
- a part or a lining layer of a gasifier, notably a coal gasifier, a petroleum coke gasifier, a biomass gasifier;
- a part or a lining layer of a reformer, notably a methane reformer, a secondary reformer;
- a furnace refractory block;
- a layer of concrete or rammed refractory of a furnace lining;
- a casting accessory part of molten metal or glass such as a plunger or a washer, a nozzle or a slide plate, a tundish, or a taphole runner or a trough cover,
- a curing support;
- an abrasion protection part;
- an abrasive;
- a cutting tool;
- a pump or hydraulic circuit element;
- a filter for liquid or gaseous filtration;
- a part of a glass furnace, preferably selected from among the group made up of a groove block or lintel, a tank block, a wall or side brick or block, a corner or angle block, a plate brick, a floor block or slab, an arch brick or support, a nozzle surround brick or block, a hole or launder brick, an electrode holder block, a glass furnace refractory spout piece, an injector block, a glass furnace groove;
- a part of a metallurgical furnace, preferably selected from among the group made up of a tank block, a wall or side brick or block, a corner or angle block, a floor block or slab, an arch brick or support, a nozzle surround brick or block, a hole or launder brick, an electrode holder block, a tap hole block, a burner block, a muffle furnace block or tube, a protective tube of a thermocouple, a thermal plunger tube, a molten metal transport tube;
- an electrolysis tank block for metal synthesis, in particular a tank side block;
- a cathode or anode block of an electrolysis tank for metal synthesis;
- a heat recovery tube, in particular a radiant tube;
- a heating element protection tube.

Preferably, the target component is a furnace part.

BRIEF DESCRIPTION OF THE FIGURES

Further features and advantages of the invention will become more clearly apparent upon reading the following detailed description and with reference to the appended drawings, in which:

FIG. 1 schematically shows an example of a monitoring device according to the invention, in a service position;

FIG. 2 shows an example of a reflected signal;

FIG. 3 schematically illustrates an analysis of a reflected signal in order to evaluate a property of the environment;

FIG. 4 shows correlation functions obtained with the reflected signal shown in FIG. 3, for different positions of the measurement window;

FIG. 5 shows the variation of a correlation index when the measurement window passes through the reflected signal;

FIG. 6 shows the variation of another correlation index when the measurement window passes through the reflected signal;

FIG. 7 illustrates various possible embodiments for a waveguide comprising beads;

FIG. 8 illustrates various possible embodiments for the waveguide.

Identical references are used to designate identical or similar components.

Definitions

Texturing involves creating microreliefs on a surface, with said microreliefs preferably being higher than one tenth or one hundredth of the outer diameter of the waveguide, or of the diameter of an electrical conductor of the waveguide. The height of the microreliefs is preferably greater than 0.05 mm, preferably greater than 0.1 mm, preferably greater than 0.2 mm, preferably greater than 0.5 mm, or even greater than 0.8 mm, and/or less than 3 mm, less than 2 mm or less than 1 mm.

A region of the waveguide "corresponds" to a portion of a reflected signal when it is at the source of the portion of the reflected signal, i.e., it has reflected the incident signal in order to generate the portion of the reflected signal.

The equivalent diameter of a waveguide or of a conductor of a waveguide is the diameter of a disk with the same surface as the cross-section of the waveguide or of the conductor of the waveguide, respectively.

A transverse plane is a plane perpendicular to the lengthwise direction.

The "measurement window" is an interval on the time axis of a graph simultaneously representing the reflected and reference signals, with the start of these signals being the instant 0 ($t_0$) on this axis (see FIG. 3). The measurement window has a duration and a position. This position is defined, on the time axis, by the position of the middle of the window relative to the start of the reflected signals.

A radiant tube is a tube, conventionally in the form of a U or even of a W, that surrounds a gas burner used for annealing steel plates. A radiant tube allows the combustion gases to be concentrated and the heat emitted by the burner to be captured in order to return it to the chamber of the annealing furnace. The thermal stresses are extremely high and controlling thermal gradients makes a device according to the invention particularly useful. A radiant tube can particularly include a ceramic material such as SiC, which allows it to withstand such gradients and to be efficient due to its high thermal conductivity.

The adjectives “first”, “second”, “reference” or “updated” are only used for the sake of clarity.

The averages are arithmetic averages.

“Local” or “locally” are used to qualify a feature or an action that only relates to a fraction of the waveguide, for example, to a fraction that is less than 5 cm, 1 cm or 1 mm long. This feature or this action is constant over this fraction.

The term “ceramic material” is conventionally understood to mean a material that is neither metallic nor organic. In a preferred embodiment, an oxide glass and carbon (in different forms, crystallized or non-crystallized) are considered to be ceramic materials.

“Comprise” or “include” or “have” must be understood in a non-limiting manner.

DETAILED DESCRIPTION

The invention uses the well-known principles of electrical time-domain reflectometry or electrical frequency-domain reflectometry, respectively, or “E-TDR” or “E-FDR”, respectively.

Conventionally, a transmitter transmits an incident signal, in the form of a pulse, in the electrically conductive medium, which returns a reflected signal, which is then analyzed in order to deduce information concerning the conductive medium therefrom.

The conductive medium in particular can be an electromagnetic waveguide. In the presence of an impedance discontinuity, for example, a significant physico-chemical variation of the medium leading to a local impedance variation, part of the incident signal is reflected toward the transmitter, which allows this variation to be identified and analyzed.

The article entitled, “*Distributed temperature sensing with unmodified coaxial cable based on random reflections in TDR signal*”, by Baokai Chen et al., 2019 Meas. Sci. Technol. 30 015105, describes the application of electrical time-domain reflectometry in order to analyze the noises in a coaxial cable in order to evaluate low temperatures.

Applications of reflectometry are described, for example, in:

- patent U.S. Pat. No. 5,609,059 for evaluating the level of liquid in a tank;
- patent JPH 11264706 A for evaluating the residual thickness of a refractory lining;
- patent WO 2019/210389 A1 for monitoring the state of concrete constructions; or
- patent U.S. Pat. No. 9,970,969 B1 for detecting variations in soil moisture content.

These solutions of the prior art are well suited for detecting a direct defect, for example, a break in the waveguide, but not for monitoring a property of an environment at numerous points.

Furthermore, the analysis of the reflected signal is hindered by the presence of noise, with the objective being to compare the reflected signal with the transmitted signal.

Finally, these solutions are often intrusive and can weaken the structure in which the waveguide is disposed.

Application

The invention is intended for monitoring a property of an environment.

Environment

The invention is not limited to monitoring a particular environment.

The use of an electromagnetic waveguide advantageously allows monitoring in a high temperature environment, for example, of more than 100° C., more than 125° C., more than 200° C. or more than 300° C. A metal waveguide sheathed with a polymer sheath allows, for example, monitoring in an environment at a temperature up to 300° C.

In one embodiment, the environment is partially or completely defined by the material of a target component or of a set of target components.

The environment to be monitored can be made up of the target component or of said set if the measurement part is housed inside the target component or said set. Otherwise, it can also comprise another part or a gaseous environment, for example, ambient air. Preferably, the waveguide is disposed so that the impedance variation generated by the discontinuities mainly results, or even substantially exclusively results, in a modification of the property in the part of the target component that is in contact with the waveguide.

In one embodiment, the environment is delimited by a virtual enclosure that extends at less than 200 cm, less than 100 cm, less than 50 cm, less than 30 cm, less than 20 cm, less than 10 cm or less than 5 cm from the waveguide.

In FIG. 1, the environment of the waveguide 12 is made up of the target component 22 and surrounding air.

Property

The measured property is preferably selected from among the temperature, the moisture content, the chemical composition, and the pressure of the environment.

In particular, the property can relate to the physical state of the target component, for example, relating to the presence of structural damage, for example, chipping, an internal crack, or a change in a phase of the material forming the target component or a set comprising several target components, for example, due to an infiltration or a corrosive attack.

The environment can be solid, liquid or gaseous.

Monitoring Device

Electromagnetic Waveguides

The waveguide 12 (FIG. 1) is in the form of a transmission line, for example, in the general form of a strip or a cable, that extends from an input end 12*e* to an output end 12*s*. It comprises:

- a measurement part 14, which comprises the discontinuities used for the measurement, i.e., in the environment in which a property is to be monitored; and
- a transmission part 16, which is used to connect the measurement part 14 to an interrogator 18.

The length of the waveguide, and preferably of the measurement part, is preferably greater than 1 m, preferably greater than 2 m, preferably greater than 5 m, preferably greater than 10 m, greater than 15 m, greater than 20 m, and/or less than 200 m, or even less than 100 m, preferably less than 50 m.

Preferably, a conductor, preferably each conductor, or even the waveguide:

- has an equivalent diameter; or
- for a conductor or a waveguide in the form of a strip, is less than 10 millimeters, less than 5 mm, and/or preferably more than 1 mm thick.

The waveguide comprises first and second electrical conductors, $12_1$ and $12_2$, respectively, for example, in the form of a cable comprising one or more wires, a cable assembly or a strip.

Each conductor comprises:

- an input end (i.e., the input end of the waveguide) electrically connected to a respective terminal of the interrogator 18; and
- at the output end of the waveguide, a free output end.

The output ends are not electrically connected to each other, so that the conductors do not form an electrical circuit, as in a resistive measurement device, through which a direct or alternating current flows.

The material of the conductors is preferably a conductive metal such as Al, Cu or a steel or a metal alloy. It also can be a ceramic or a cermet. In particular, for an application in a high temperature environment, the conductors can be made of:

- inconel (for example, 625 and 690 alloys), which can be used up to 1,100° C.;
- platinum;
- kanthal of the FeCr type, for example, KANTHAL APM, which can be used up to 1,425° C.;
- tungsten;
- rhodium;
- ruthenium;
- palladium.

A conductor made of a metal lined with a conductive refractory oxide of $SnO_2$ or of Spinel $Cr_2O_3$—MgO or of perovskite or of metalloid carbide or of metal can be suitable at very high temperatures.

Alternatively or in addition, the waveguide and/or each conductor can be inserted into a protective sheath, which optionally is segmented, in order to protect the conductors against heat and/or corrosion and/or chemical attacks.

The protective sheath notably can be made of polymer (for example, made of PET or PE), or of ceramic, notably of alumina, notably for an environment at a temperature above 400° C.

The protective sheath is preferably made of a material with a thermal expansion coefficient that is substantially identical to that of the material of the conductors.

Preferably, the thermal expansion coefficient of the waveguide, preferably at least of the measurement part, is substantially identical to that of the target (+/−20%, preferably +/−10%).

The waveguide, and in particular at least the measurement part, also can be fixed on a support 20, for example, a plate, which itself is in contact with the target component 22. The support is preferably at least partially made of a material made up of fibers bonded together by a ceramic matrix, called "ceramic matrix composite". The fibers and the ceramic matrix will be selected according to the environment in which the ceramic matrix composite must be placed, notably as a function of the temperature, corrosion, thermal cycling, expansion conditions, and depending on the nature of the target component to be provided.

The arrangement of the fibers is selected as a function of the desired shape for the ceramic matrix composite, and of the ease for fixing or inserting the conductors therein. For example, a stack of woven fabrics or layers of fibers is well suited for simple plates, a filament winding is well suited for plates with a cylindrical geometry, filament placement is well suited for large complex shapes.

The electrical resistivity of the conductors is preferably less than 10 micro-ohm·m in the temperature range of the environment, preferably between 20 and 1,000° C.

According to a first embodiment, each conductor is formed by a cable formed by one or more wires. The two cables are non-coaxial and kept at a distance from each other by a dielectric insulator, preferably with electrical resistivity of more than 10, 50, 100 or 1,000 times that of the conductors.

According to a second embodiment, which is not preferred, the waveguide is formed by a coaxial cable, for example, of the BNC type, comprising an inner wire or sleeve forming the first conductor and an outer sleeve forming the second conductor, with the two sleeves being separated by an electrically insulating intermediate sleeve. Discontinuities 24 can be created by modifying the surface condition of the insulating sleeve, for example, by creating roughness. Another approach involves creating random discontinuities on the outer sleeve, for example, by abrasion (without stopping the electrical conduction within the outer sleeve).

Irrespective of the embodiment, the lack of direct electrical contact between the two conductors can be facilitated by interposing a dielectric insulator 25, for example, made of mica or a mica derivative, made of barium titanium, of mullite, cordierite or alumina.

The dielectric insulator can be one-piece or can be made up of a set of several dielectric blocks. Preferably, the dielectric blocks are interposed between the conductors, with the blocks preferably being in the form of beads threaded onto at least one of the conductors, preferably onto the two conductors.

The dielectric blocks can have identical or different shapes and/or dimensions and/or can be made of identical or different materials. Even if the dielectric blocks appear to be identical, no block is completely identical to another. It is thus possible to randomly create discontinuities 24, and in particular base discontinuities.

It is also possible to create discontinuities 24 by modifying the surface condition of the dielectric insulator 25 (texturing), for example, by creating roughness. Another approach involves creating random discontinuities on the dielectric insulator 25, for example, by abrasion.

The predetermined distance between the two electrical conductors is preferably substantially constant. The two conductors are preferably parallel, except, optionally, in the zones of the discontinuities. Local parallelism defects can be provided in order to create discontinuities, and in particular base discontinuities.

The length of the dielectric blocks, and in particular of the beads, measured along the length of the waveguide, can be greater than 10 mm, 15 mm or 20 mm and/or less than 100 mm or 50 mm.

The waveguide preferably complies with the Rayleigh scattering condition so that the regions that reflected the base secondary echoes can be easily located. Preferably, the base discontinuities 24 are spaced apart from one another by a distance, measured along the waveguide, that is at least 20 times, preferably at least 15 times, preferably at least 10 times less than the reference wavelength, equal to the propagation speed of the incident signal, approximately 200,000 km/s for an electromagnetic wave, divided by the frequency of the highest peak of the frequency spectrum of the incident signal. For example, for a reference wavelength of approximately fifteen centimeters, blocks or beads that are less than 3 cm, preferably less than 2 cm or 1 cm long are well suited. For example, for an incident signal with a frequency of 1 GHz, alumina beads that are less than 10 mm long and are threaded onto platinum wires produce secondary echoes with an excessively low amplitude, while beads that are more than 100 mm long produce direct secondary echoes.

This distance can be particularly defined by the length of dielectric blocks, in particular of beads, threaded onto the waveguide.

The frequency of the incident signal is conventionally adapted to the length of the measurement part. The wavelength of the incident signal is conventionally less than the length of the measurement part of the waveguide. The ratio of the wavelength of the incident signal to the length of the measurement part of the waveguide preferably ranges between 0.1 and 0.9, preferably ranges between 0.1 and 0.5, and preferably ranges between 0.1 and 0.3.

Preferably, the length of the measurement part of the waveguide is not a multiple of the wavelength of the incident signal in order to avoid resonance problems.

For example, the frequency of the incident signal can be 1 GHz (corresponding to a wavelength of approximately 20 cm) for a length of the measurement part of the waveguide ranging between 10 and 15 m, for a measurement at 600° C. or more.

In order to generate enough base secondary echoes, the length of the blocks is then preferably adapted, as a function of the frequency of the incident reference signal, so as to comply with the Rayleigh scattering condition.

The width, i.e., a larger dimension in a plane transverse to their lengthwise direction, of the dielectric blocks, and in particular of the beads, is preferably greater than 1 mm, 2 mm or 3 mm and/or less than 10 mm or 5 mm.

FIG. 7 illustrates various possible embodiments for the waveguide. In particular, it illustrates embodiments in which:

- beads 23 are threaded onto only one of the first and second conductors (7E) or onto the two first and second conductors (7A-7D);
- beads 23 are threaded in order to form a segmented (7A, 7C-7E) or non-segmented (7B) protective sheath 27, on the two first and second conductors (7A-7D), for one (7E) or for the two conductors;
- beads 23 of identical (7A, 7D) or different (7B, 7C, 7E) shape are threaded;
- beads 23 with surfaces that are textured in the same way (7A-7C, 7E) or not in the same way (7D) are threaded;
- one or more of the conductors may (7A, 7B, 7C, 7D) or may not (7E) extend symmetrically relative to the axis of each bead 23;
- one or more of the conductors may (7A-7E) or may not extend parallel to the axis of each bead 23.

The variations in the shape and the composition of the beads and the variations in the positioning of the beads relative to the conductors allow the discontinuities that they generate to be rendered random.

The beads also facilitate the identification of regions generating base secondary echoes, and therefore act as identification marks.

Discontinuities

A "discontinuity" is part of the waveguide capable of returning a specific echo in response to an incident signal, preferably in the form of a low variation in electrical potential. This echo is modified when the impedance of the discontinuity varies, notably when it experiences a modification to the property of its local environment (i.e., in the region of the discontinuity). The discontinuity can particularly result from a local variation of the structure and/or of the composition of the waveguide, and in particular of one of the conductors of the waveguide, and/or of an insulator disposed between said conductors.

The impedance of a discontinuity particularly can be modified when the shape and/or the local temperature of the waveguide, and/or the nature of the local environment, i.e., around the discontinuity is/are modified. If only one of the discontinuity modification factors is modified, for example, the local temperature, a link accordingly exists between the impedance, and therefore the echo, and the value of this factor. The invention proposes an efficient and reliable way of establishing a link between an echo and this factor.

The discontinuities 24 can be obtained by modifying the surface and/or the constituent material of one or both of the conductors and/or of the dielectric insulator, for example, by modifying the surface by abrasion, by chemical etching, by adding a dopant to the material.

The number of discontinuities, in particular of base discontinuities, per waveguide meter is preferably greater than 10, greater than 20, greater than 30, greater than 40 or greater than 50, and/or less than 10,000, less than 1,000, less than 500, less than 100. Advantageously, it is thus possible to evaluate the property of the environment over substantially the entire length of the waveguide, and with good precision.

Preferably, the distance between any two discontinuities 24, in particular of any two successive base discontinuities along the waveguide 12, is less than 1/100 of the wavelength of the incident signal (equal to the propagation speed of the incident signal, approximately 200,000 km/s for an electromagnetic wave, divided by the frequency of the highest peak of the frequency spectrum of the incident signal).

This distance is preferably greater than 10 mm, 15 mm or 20 mm and/or less than 100 mm or 50 mm.

The sensitivity of the information provided by the interrogator is advantageously improved.

The use of discontinuities returning a low variation in electrical potential avoids having to create significant discontinuities, capable of significantly damping the incident signal, and therefore of preventing monitoring over the entire length of the waveguide. Preferably, more than 50%, preferably more than 80%, preferably more than 90% of the discontinuities return base and/or noise secondary echoes, preferably base secondary echoes.

The exploitation of these low random variations in electric potential is contrary to the developments in electrical reflectometry, for which noise is considered to be detrimental. Preferably, discontinuities are randomly added to the waveguide.

The discontinuities are variable, i.e., they do not all return the same echo when they receive the same incident signal. More preferably, the variation in the discontinuities, in particular of base discontinuities, is random.

Preferably, the discontinuities are not evenly distributed along the waveguide. Preferably, the discontinuities, in particular base discontinuities, are randomly distributed along the waveguide.

The random nature of the distribution or of the intensity of the discontinuities advantageously avoids the risk of creating an accumulation of secondary echoes with the same period, which is likely to significantly dampen the incident signal.

With base discontinuities and under Rayleigh scattering conditions, it is thus possible to carry out precise measurements over a length of more than 1 m, preferably of more than 2 m, preferably of more than 5 m, preferably of more than 10 m, of more than 15 m, or of more than 20 m, and/or of less than 500 m, for example, over the entire length of the measurement part.

The measurement part of the waveguide can extend substantially parallel to the outer surface of a target, i.e., a target component or a set of target components, and/or substantially perpendicular to said outer surface, with the measurement part entering the target.

Preferably, the target is equipped with a plurality of measurement parts, preferably parallel to one another, so that the density of discontinuities, preferably the density of base discontinuities, on the equipped surface is greater than 3, preferably greater than 10, preferably greater than 50, preferably greater than 100, preferably greater than 1,000, preferably greater than 2,000 discontinuities and/or less than 1,000,000, preferably less than 1,000,000, preferably less than 500,000, preferably less than 100,000, preferably less than 10,000, preferably less than 5,000, per $m^2$ of surface.

The reliability of the analysis in step d) is improved.

Preferably, the measurement parts form a layer extending along a curved or flat surface, preferably flat, with each corresponding waveguide preferably being connected to an interrogator that is specific thereto.

Notably, in the case of a set of several target components, the measurement device can include from 1, more than 2, preferably more than 3, preferably more than 5 of said layers, with said layers preferably being parallel to one another and preferably being evenly spaced apart from one another in a direction perpendicular to a surface of the set, with the distance between two successive layers preferably being less than 10 cm, 5 cm, or 2 cm.

Interrogator

The input ends of the electrical conductors of the waveguide are electrically connected to the interrogator 18, or "reflectometer". The interrogator is configured to:

- inject the incident signals by establishing a variation in the potential difference between the two conductors of the waveguide; and
- analyze the signals reflected in response to the incident signals.

The interrogator 18 conventionally comprises a transmitter/receiver 26 and a control module 28 (FIG. 1). The control module 28 conventionally comprises a processor and a memory loaded with a computer program. By virtue of this computer program, the processor can control the transmission of the incident signals and analyze the received reflected signals in order to identify the echoes returned by the discontinuities.

The interrogator can be, for example, a voltage generator coupled to an oscilloscope allowing the reflected signals to be received and analyzed. The interrogator can be a network analyzer provided with software such as "VNA software" for generating the incident signal and analyzing the reflected signal.

Determination Method

A method according to the invention comprises steps a) to d).

In step a), an electromagnetic waveguide 12 is introduced into the environment to be monitored.

Waveguide Fixation

The waveguide, and in particular the measurement part, can be immobilized in said environment.

At least part of the waveguide, preferably at least the measurement part, can extend into a recess, preferably a groove, provided on a face of the target or, preferably, is in contact with an outer surface of the target, preferably against a cold face of the target.

The measurement part particularly can be fixed to the target by being inserted into a groove or several fixing points, with the length of each fixing point being, along the waveguide, preferably less than 5 cm, 3 cm, 2 cm, 1 cm, or 0.5 cm.

In one embodiment, the waveguide is not straight between two fixing points, at ambient temperature. Preferably, the length of the waveguide between two successive fixing points is more than 1.05 times, preferably more than 1.1 times and/or preferably less than 1.5 times, preferably less than 1.4 times, preferably less than 1.3 times, the distance between said fixing points. Advantageously, the waveguide can thus adapt to dimensional variations of the one or more target components on which it is fixed.

In one embodiment, the measurement part at least partially, preferably completely, extends inside the target. This embodiment is well suited when the target is a block, formed from a mixture of grains, which is shaped and then undergoes a consolidation heat treatment compatible with the mechanical and thermal resistance of the waveguide material. Such a mixture can be, for example, a concrete, a cement, a ramming mix or a grout, with the measurement part being integrated when manufacturing the target.

The measurement part also can be housed between the target and a layer made of another material, for example, an electrically and/or thermally insulating layer. The measurement part also can be inserted into said layer, which then acts as a support, or can be sandwiched between two layers successively disposed on the target.

Steps b1) and b2) are similar, as are steps c1) and c2). They only differ in that the environment is different between:

- steps b1) and c1), which are carried out, at a reference instant, in a reference situation, for example, while the waveguide is at 20° C.; and
- steps b2) and c2), which are carried out, at an updated instant, in an updated situation, for example, while the waveguide is at least partially at 600° C.

The reference instant can be before or after the updated instant. Preferably, it is before the updated instant. The determination method according to the invention can be particularly implemented for monitoring the environment, at various updated instants. In other words, steps b1) and c1) are initially carried out, then steps b2) and c2), d) and optionally step e), are repeated at different updated instants.

In steps b1) and b2), the interrogator is used to inject an incident signal via the input end of the waveguide.

Any incident signal can be contemplated, provided that it is identical for the two steps b1) and b2). It is preferably selected to minimize the disturbances that it induces on the properties of the dielectric material of the waveguide, and in particular to avoid a "breakdown" of the dielectric material.

The incident signal preferably assumes the form of a pulse or "dirac", in particular if, in step 1), the intercorrelation functions relate to the amplitude of the reflected signals.

The incident signal can assume the form of a periodic wave assuming any shape.

The incident signal can be repeated.

Preferably, the maximum amplitude of the incident signal ranges between 0.1 and 100 V, preferably less than 10 V, preferably less than 1 V.

The frequency of the highest peak in a frequency spectrum of the incident signal is preferably greater than 10 KHz, preferably greater than 100 KHz, preferably greater than 1 MHZ, preferably greater than 100 MHz, preferably greater than 200 MHz, preferably greater than 1 GHz, and/or less than 50 GHz, preferably less than 30 GHz, preferably less than 20 GHz, preferably less than 10 GHz, preferably less than 6 GHz, preferably less than 4 GHz.

The incident signals can be sent in the form of signal trains preferably comprising a series of periodic signals with variable frequencies according to the considered periodic signal.

Each incident signal propagates in the waveguide up to the output end of the waveguide. On each discontinuity, part of the incident signal, or "echo", is reflected toward the input end. All the echoes returned to the output end together form the reflected signal associated with the incident signal.

In steps c1) and c2), the interrogator receives a reference reflected and updated signal, respectively, associated with the incident signal.

FIG. 2 illustrates an example of a reflected signal, with the ordinate axis providing the amplitude in volts (V) and the abscissa axis providing the elapsed time since the reception instant to of the reflected signal, in hundreds of nanoseconds ($10^{-7}$ s).

In particular, it is possible to distinguish the transmission echo returned by the input end (shown in FIG. 3), the back echo 30 returned by the output end, a direct secondary echo 32 returned by a direct fault, for example, damage to the waveguide, a set of noise secondary echoes 33 and a set of base secondary echoes 34 returned by base discontinuities. The noise 33 and base 34 secondary echoes have low amplitudes, and have various amplitudes and shapes. In this embodiment, the base secondary echoes are consolidated in the part 35 of the reflected signal. When the measurement window is in this part 35 of the reflected signal, the echoes in this window therefore are predominantly base secondary echoes.

In step d), the interrogator analyzes the reference reflected and updated signals so as to determine said property of said environment and/or an evolution of said property.

Preferably, the analysis of step d) comprises steps 1) to 3).

In step 1), a measurement window and a position for this window on the time axis are determined, so as to define:

- a "reference" portion, $Pr_1$, for the reference reflected signal (shown as solid lines in FIG. 3), acquired at the reference instant; and
- an "updated" portion, $Pa_1$, for the updated reflected signal (shown as dashed lines in FIG. 3), acquired at the updated instant.

The position of the measurement window is defined, on the graph showing the reference and updated reflected signals, relative to the instant to that marks the start of the reflected signals. The measurement window is, in the considered example, a time range [$t_1$-$t_1$'] defined with reference to the instant to at which the start of any reflected signal is set.

The portions of the reference reflected signal and of the updated reflected signal are the parts of these reflected signals that extend into the measurement window.

The portions of the reference reflected signal and of the updated reflected signal therefore contain the echoes returned by the same discontinuities of the waveguide, in a first region $R_1$ of the waveguide.

When the reference and updated reflected signals are shown on a graph, as in the graph at the top of FIG. 3, with the abscissa being the elapsed time from the start of these signals (instant $t_0$), the reference and updated portions, delimited by limits of the measurement window (frame $F_1$), are therefore parts of these reflected signals that extend between the instants $t_1$ and $t_1$'.

The reference reflected signal is the signal reflected in the reference situation, i.e., when the waveguide is in a "reference" environment, in response to the incident signal. Preferably, the property to be evaluated is known, in the environment of the reference situation, at least in the region of the waveguide that returned the reference and updated portions. In the example of FIG. 3, the reference environment is at 20° C. throughout the waveguide.

The intercorrelation function between the reference and updated portions is then determined for this position of the measurement window.

An intercorrelation function is conventionally shown in the form of a curve such as that shown in FIG. 4, with:

- a main peak, substantially centered on a "main phase shift" dt on the abscissa, with the top of the main peak defining a "maximum correlation"; and
- smaller peaks, on each side of the main peak.

In FIG. 4, the correlation on the ordinate is normalized relative to a correlation obtained when the waveguide is entirely in an environment at 20° C.

The intercorrelation function between the reference and updated portions therefore produces, for the measurement window corresponding to the frame $F_1$, a main peak $P_1$, centered on a main phase shift $dt_1$ and having a maximum correlation $C_1$.

Preferably, in order to determine the main phase shift and the maximum correlation, a Coda Wave Interferometry (CWI) method is used. This method is notably described in the article entitled, "The Theory of Coda Wave Interferometry", by Roel Snieder, Pure appl. geophys. 163 (2006) 455-473 0033-4553/06/030455-19.

The coda wave interferometry method is particularly used in the seismic field, as described in the publication entitled, "Coda Wave Interferometry for Estimating Nonlinear Behavior in Seismic Velocity", by Snieder et al., in Science Vol. 295, 2002.

The incident signals injected to obtain the reference and updated reflected signals are identical. If the property of the environment has evolved, in the region of the discontinuities corresponding to the measurement window or upstream of this region, between the reference and updated instants, this evolution leads to a modification of the shape of the intercorrelation function.

This shape modification results in a modification of one or more correlation indices. In particular, the main phase shift and/or the maximum correlation evolve as a function of said evolution of the property of the environment.

In step 2), one or more correlation indices, preferably the maximum correlation and/or the main phase shift, are determined.

In step 3), a value of said property in said region $R_1$ of the waveguide and/or upstream of this region is determined based on the value of said one or more correlation indices.

Simple tests allow a value for said property to be associated with the value of said one or more correlation indices, in particular with a maximum correlation and/or a main phase shift.

For example, at the reference instant, the waveguide can be straight. The reference reflected signal is recorded and the reference portion is determined.

The region $R_1$ of the waveguide is then curved according to different radii of curvature, for example, 100 cm, 90 cm, 80 cm, 70 cm, 60 cm, 50 cm, 40 cm, 30 cm, 20 cm, 10 cm, at corresponding updated instants. Each time:

- the updated reflected signal is recorded;
- the updated portion is determined;
- the intercorrelation function is computed between the updated portion and the reference portion;
- the maximum correlation is measured.

It is thus possible to establish a correspondence table between:

- the maximum correlation; and
- a curvature of the region $R_1$ of the waveguide.

According to another example, at the reference instant, the environment of the waveguide can be consistently at a temperature of 20° C. The reference reflected signal is recorded and the reference portion is determined.

The waveguide is then heated at different temperatures, for example, 100° C., 200° C., 300° C., 400° C., 500° C., 600° C., 700° C., 800° C., and 900° C., at corresponding updated instants. Each time:

- the updated reflected signal is recorded;
- the updated portion is determined;
- the intercorrelation function is computed between the updated portion and the reference portion;
- the main phase shift is measured.

It is thus possible to establish a correspondence table between:

- the main phase shift; and
- a temperature in the region $R_1$ of the waveguide.

The same approach, applied to another region, allows a correspondence table to be established between:

- the main phase shift; and
- a temperature in the part of the waveguide that extends up to and including this other region.

The precision of the results is noteworthy, even with reflected signals comparable to low random variations in amplitude.

In general, the greater the duration of the measurement window, the better the reliability of the evaluation of the property in the region, but the location of the completed measurement is less precise.

If "reference period" refers to the period corresponding to the frequency of the highest peak of the frequency spectrum of the reference reflected signal, i.e., equal to the inverse of said frequency, the duration of the measurement window is preferably greater than a reference period, preferably greater than two reference periods, preferably greater than three reference periods, preferably greater than four reference periods, and/or less than 10 reference periods, preferably less than 8 reference periods, preferably less than 6 reference periods.

Preferably, the analysis is repeated for several positions of the measurement window, with the measurement window preferably retaining its duration. In a preferred embodiment, the measurement window slides so that it passes through the reflected signals, preferably at least over the entire range corresponding to the measurement part, and, for each position of the measurement window, one of said analyses is carried out. The environment throughout the waveguide thus can be "scanned".

Preferably, the measurement window is initially positioned at the position $t_{w,1}$ so as to begin at the instant $t_0$ ($t_1=t_o$) and an analysis step d) is carried out. The analysis then relates to part of the waveguide that extends at the beginning of the measurement part. The instant $t_1$ (and therefore the instant $t_1'$, with the duration of the measurement window being constant) is then incremented by a predetermined duration, for example, by a quarter of the duration of the measurement window, and a new analysis step d) is carried out. The cycle is repeated, preferably until the instant $t_1'$ reaches the instant $t_3$ marking the end of the measurement part, in this case identifiable by the back echo.

FIG. 3 shows the two extreme positions for the measurement window, corresponding to the first region $R_1$ and to the $21^{st}$ region $R_{21}$ of the waveguide obtained by sliding the measurement window to a $21^{st}$ position.

For the sake of clarity, in the position corresponding to the first region:

- the measurement window, which extends between the instants $t_1$ and $t_1'$, has been shown by the frame $F_1$;
- the reference portion has been referenced $Pr_1$;
- the updated portion has been referenced $Pa_1$;

- the main peak on the intercorrelation curve has been referenced $P_1$ (FIG. 4);
- the maximum correlation has been referenced $C_1$ (FIG. 4); and
- the main phase shift has been referenced $dt_1$ (FIG. 4).

In the position corresponding to the $21^{st}$ region:

- the measurement window, which extends between the instants $t_{21}$ and $t_{21}'$, centered on the position $t_{w,21}$, has been shown by the frame $F_{21}$;
- the second reference portion has been referenced $Pr_{21}$;
- the second updated portion has been referenced $Pa_{21}$;
- the second main peak on the intercorrelation curve has been referenced $P_{21}$ (FIG. 4);
- the maximum correlation has been referenced $C_{21}$ (FIG. 4); and
- the main phase shift has been referenced $dt_{21}$ (FIG. 4).

Preferably, the measurement window is at least moved, or even exclusively moved, to part of the reference and updated portions comprising only base or noise secondary echoes, preferably substantially only base secondary echoes.

Several interpretations of the intercorrelation function are possible.

It can be interpreted using intercorrelation functions established for the same position of the measurement window, with the same reference reflected signal, but with updated reflected signals acquired at different updated instants, in which the region of the waveguide corresponding to said position is subjected to a local environment that is different each time, as explained above.

In an alternative embodiment, the correlation functions computed for two different measurement windows are compared. The differences in values of the correlation indices between these intercorrelation functions advantageously allows differences to be determined concerning the value of the property between the concerned regions.

This alternative embodiment can be illustrated in FIGS. 3 and 4. The differences between the main peaks $P_1$ and $P_{21}$ indicate different values for the property in the regions of the waveguide corresponding to the first and $21^{st}$ positions of the measurement window.

This alternative embodiment advantageously allows a local evolution of the different property in the two regions to be detected, and thus, for example, allows an abnormal evolution of the property in one of the two regions to be detected without having to know the value of the property, or having to establish a correspondence table between the values of the one or more correlation indices and the local values of the property.

Preferably, after step d), the method comprises a step e).

In step e), the computer that analyzed the reflected signals generates an information message concerning the result of said analysis.

Preferably, the message specifies:

- a value for the property; and/or
- a value for an evolution of the property relative to a situation before the updated instant, and in particular relative to the reference situation; and/or
- a location of the region of the environment for which the property has been evaluated.

The message can be sent to a central computer and/or be presented to an operator, for example, on a screen and/or by activating a light and/or by emitting an audible signal.

Example

A waveguide is formed from two electrical conductors in the form of 0.5 mm diameter and 5 m long wires, one of which is made of pure platinum and the other one of which is made of platinum with 10% rhodium. Alumina beads sintered at 99.7% of $Al_2O_3$, each having a 3 mm outer diameter and being 20 mm long, and being longitudinally perforated with two 0.8 mm diameter through-holes spaced apart from one another by 0.5 mm, are threaded onto the wires, with each wire passing through a respective hole. The beads thus maintain a distance of approximately 0.5 mm between the two wires. The discontinuous sleeve formed by stacking the beads forms a protective sheath for protecting the two wires. The waveguide formed thus is placed on a table, winding in a random manner.

The discontinuities resulting from the spaces between the alumina beads and the curvature of the waveguide allow impedance variations to be created over the entire length of the waveguide, in a substantially random manner.

The two wires at the input end of the waveguide are connected to a Copper Mountain S5085 interrogator. At the output end, the two wires are cemented (Fixwool Adhesive UNIFRAX cement) to the last bead so as to avoid any contact between the two wires and to hold the beads in place.

The interrogator acts as a transmitter and a receiver. It is connected to a computer via a USB port allowing the software to be downloaded, the calibration and the adjustment of the measurement parameters and representation on the screen of the computer.

The incident signal is an electrical pulse generated by means of the interrogator as follows: the interrogator is set to the position S11 for using channel 1, which corresponds to measuring the reflection coefficient in the cable with the "Time Domain" mode. The most suitable display for this measurement is called the "Real" display, which corresponds to the representation in the real-time domain.

The parameters for setting the interrogator are as follows:

"Stimulus" menu;
- Start 9 kHz/Stop 2 GHz/Center 1 GHz: representing the scanning frequency domain of the apparatus;
- Lin freq/30,000 Pts: representing a linear scanning frequency mode and the number of measurement points;
- IF Bandwidth 100 kHz representing the bandwidth;

"Analysis" menu:
- Start 0 ns Stop 60 ns Center 30 ns Span 60 ns;
- Low pass Impulse type;
- Window max;
- Set Low pass frequency.

In the reference situation, the entire waveguide is at 20° C.

In response to generating the incident signal in the form of an electromagnetic pulse of a few nanoseconds, the interrogator receives a reference reflected signal. The reference reflected signal is shown in the form of a curve providing the evolution of the reflection coefficient as a function of the time of flight, along the waveguide. The reflection coefficient is the ratio between the difference between the impedance of the free end of the waveguide and the characteristic impedance of the transmission line formed by the waveguide, on the sum of these two impedances. It is automatically computed by the interrogator as a function of the differences in potential between the two electrical conductors of the coaxial cable.

The reference reflected signal also can be shown in the form of a variation in potential.

The back echo is detected, then noise secondary and base echoes are detected, induced by partial reflections of the incident signal on the discontinuities resulting from the presence of the beads, as well as by the perfect non-parallelism between the two conductors.

The back echo has an amplitude of 0.3.

In the updated situation, the waveguide successively passes through two furnaces, entering and exiting each furnace through holes surrounded by insulating fibers in order to maintain the temperature of the furnace. The distance between the interrogator and furnace No. 1 is 151 cm. The width of furnace No. 1 is 43 cm. The waveguide length between the two furnaces is 160 cm.

The width of furnace No. 2 is 64 cm. The waveguide extends out of furnace No. 2 for 81 cm. In order to achieve the updated situation, the temperature of the furnaces is increased, with a programmed increase rate of 100° C./h, up to 600° C.+/−15° C.

An incident signal identical to that sent in the reference situation is then injected and an updated reflected signal is recorded by the interrogator.

The two graphs of the lower part of FIG. 3 simultaneously show portions of the two reference and updated signals, in measurement windows shown by the frames $F_1$ and $F_{21}$.

An analysis of the reference and updated signals is then carried out according to the invention, using the CWI method. It is illustrated in FIGS. 4 to 6.

A measurement window with a constant duration of approximately 8 ns is defined, then moved along the time axis, substantially from the emission echo to the back echo. Thus, 21 positions are successively defined for the measurement window, with a cycle of steps 1) to 2) being implemented for each position. "$t_{w,n}$" designates the $n^{th}$ position of the center of the measurement window. The sliding step is 2.5 ns, which allows information overlaps to be provided. In FIG. 3, the measurement window is only shown in positions $t_{w,1}$ and $t_{w,21}$ (frames $F_1$ and $F_{21}$).

For each position $t_{w,n}$, the normalized intercorrelation function $Ri^{(t,T)}$ is computed for the updated position, according to the following equation (1):

[Math 1]

$$R_i^{(t,T)}(t_w) = \frac{\int_{t-T}^{t+T} s_0(t')s_i(t'+t_w)dt'}{\sqrt{\int_{t-T}^{t+T} s_0^2(t')dt' \int_{t-T}^{t+T} s_i^2(t')dt'}} \quad (1)$$

where $s_0$ is the reference position, si designates the updated portion for the updated situation "i", in this case the updated situation in which some parts of the waveguide are disposed in a furnace at 600° C., t represents the time, 2T is the size of the sliding window and $t_w$ is the $n^{th}$ position of the center of the measurement window, i.e., $t_{w,n}$.

When the measurement window is centered on the position $t_{w,n}$, the equation (1) provides a value for each instant t in the measurement window. The curves corresponding to the first and $21^{st}$ positions are shown in FIG. 4. The maximum value C; and Ca of the correlation (approximately 1 for the position $t_{w,1}$ (frame $F_1$) and 0.085 for the position $t_{w,21}$ (frame $F_{21}$)), as well as the positions of the phase shifts $dt_1$ and $dt_{21}$ of these maximum values relative to zero (0 for $F_1$, approximately −0.2 for $F_{21}$), are noted in FIG. 4.

The phase shift $dt_n$ for the $n^{th}$ position of the measurement window is a correlation index whose value depends on the difference between the reference situation and the updated situation i. A zero value for $dt_n$ indicates that the signals reflected in the reference situation and in the updated situation have remained in phase upstream and up to the $n^{th}$ region $R_n$ of the waveguide corresponding to this position ("upstream part" of the waveguide), i.e., no property of the environment that modifies the propagation speed in the waveguide, for example, the temperature and/or the composition of the environment, for example, the moisture content in the environment, has been modified from the input end to the $n^{th}$ region $R_n$, between the reference situation and the updated situation. A non-zero value for $dt_n$ on the contrary indicates that at least one such property of the environment of the upstream part of the waveguide has been modified between the reference situation and the updated situation, i.e., between the reference instant and the updated instant.

The variation of said property between the reference situation and the updated situation in the upstream part of the waveguide can be determined by means of a correspondence table, which requires experimental calibration.

Remarkably, the inventors have nevertheless observed that, for a constant composition of the environment, it is possible to directly determine a temperature variation between the reference situation and the updated situation in the upstream part of the waveguide, by mathematically linking the phase shift din to the difference in the average speed of the incident signal in this upstream part, between the reference and updated situations. For example, in each region of the upstream part of the waveguide that is hotter in the updated situation than in the reference situation, the incident signal circulates faster in the updated situation than in the reference situation, which leads to an increase in the absolute value of the phase shift.

If

- V designates the average speed in the upstream part, in the reference situation; and
- dV is the difference between this speed and the average speed in the upstream part, in the updated situation,
- then the normalized phase shift $dt_n/t_{w,n}$ is substantially proportionate to the relative variation in propagation speed dV/V.

V can be easily determined experimentally or by means of a computation. The normalized phase shift $dt_n/t_{w,n}$ therefore allows dl to be determined, and therefore allows the average speed in the upstream part to be determined in the updated situation. This updated situation depends on the dielectric constant of the upstream part $(v=c/(\varepsilon \cdot \mu)^{1/2}$, where c is the speed in the vacuum, $\varepsilon$ is the dielectric constant and $\mu$ is the magnetic permeability, which itself depends on the average temperature in the upstream part of the waveguide. The relationship between the dielectric constant and the temperature can be established experimentally. It is thus possible to determine this average temperature as a function of the normalized phase shift $dt_n/t_{w,n}$.

The normalized phase shift $dt_w/t_{w,n}$ therefore allows a temperature value to be determined without having to establish a correspondence table, and therefore without having to use direct temperature measurements, for example, with thermocouples.

In order to determine the one or more regions in which the temperature is different in the updated situation and in the reference situation, the reflected signals are then passed through the measurement window, with steps 1) and 2) being repeated each time. The positions of the measurement window in which dV/V significantly evolves indicate the regions in which the temperature in the updated situation is substantially different from that in the reference situation.

FIG. 5 thus shows dV/V as a function of $t_{w,n}$, i.e., in the same way, along the waveguide. It is possible to locate regions of the waveguide corresponding to the position twin of the measurement window on the time axis to the extent that the back echo is visible in FIG. 3 (substantially centered on the instant 55 ns), according to the radar principle (as a function of the propagation speed v of the incident signal in the waveguide and of the time of flight $t_f$, i.e., the duration between the instant for transmitting the incident signal and the instant for receiving the echo returned by a discontinuity in said region (position of the discontinuity $0.5.v.t_f$)).

FIG. 5 thus shows rapid evolutions dV/V in the regions $Z_2$ and $Z_4$ corresponding to the regions of the waveguide placed in the furnaces. In these regions, the phase shift increases progressively, under the cumulative effect of the local temperature difference along these regions, between the reference and updated situations.

It can be seen that the assumption of proportionality between dV/V and the normalized phase shift is not perfect. With this hypothesis, the curve of FIG. 5 should in fact have plateaus in the zones in which the phase shift does not increase, with the temperature in these zones being identical in the reference and updated situations. However, in the part of the waveguide that corresponds to the first positions of the measurement window, a relative variation in propagation speed is observed.

In order to improve the precision for interpreting these first positions of the measurement window, it is preferable to precede the measurement part of the waveguide with a "dead" part, the environment of which is not to be monitored, preferably with a length of more than 1 m, preferably more than 3 m, preferably more than 4 m, preferably more than 5 m, preferably more than 6 m.

The inventors have also found that the representation of the normalized phase shift or of a function of this ratio, preferably a derivative of this normalized phase shift relative to $t_{w,n}$, or, in the same way, a gradient of this normalized phase shift relative to the position along the waveguide, facilitates the analysis. The normalized phase shift and its derivative form examples of particularly discriminating correlation indices.

FIG. 6 shows, for each position of the measurement window, i.e., for each point along the measurement part, the value of the maximum correlation for a considered position of the measurement window.

FIG. 6, like FIG. 5, allows the two regions, $Z_2$ and $Z_4$, of the measurement part to be distinguished in which the value of the maximum correlation exhibits a minimum.

Based on a value of the maximum correlation and on a correspondence table, it is possible to determine a temperature in the region of the corresponding waveguide.

The invention is particularly well suited to measurements in an environment with a temperature greater than 100° C., greater than 125° C., greater than 200° C., greater than 300° C., greater than 500° C., or greater than 700° C.

However, the field of application of the invention is not limited.

As is now clear, the invention provides a solution for evaluating, precisely and based on the same updated reflected signal, at multiple points and in real time, several properties of an environment, in particular a temperature in a high-temperature environment and a modification of the physical state of the environment, for example, the appearance of cracks.

Of course, the invention is not limited to the embodiments described and shown, which are provided for illustrative purposes only.

In particular, the number and the shape of the waveguides for a target, the number of waveguides connected to an interrogator, the target shape, or the means for disposing a waveguide close to a target are not limiting.

The waveguide can include a plurality of measurement parts. Thus, a waveguide can allow simultaneous monitoring of a plurality of targets or of the same target in different environments, with a measurement part being disposed in each environment.

In step d), the analysis of the signals is not limited to the coda wave interferometry method described in detail above.

For example, a stretching method can be used.

This method does not involve monitoring the time shift of the updated reflected signal relative to the reference reflected signal, but involves expanding the time scale of the measurement window in order to compensate for the speed variations of the updated reflected signal. For the various sizes of the window during expansion, the intercorrelation function is computed, which takes into account the temporal variability due to the expansion, and the maximum of said function, also called "maximum correlation", is identified.

According to yet another possible embodiment, step d) implements a signal processing algorithm called "DTW" or "Dynamic Time Warping". The reference portion and the updated portion of step d) then each correspond to a respective point. An "error function" type mathematical function, for example, corresponding to the square of the amplitude difference, allows an error value to be computed for each updated portion, in other words for each point of the updated reflected signal. The function, called "distance function", for representing the distribution of errors for each updated portion forms the intercorrelation function, the minimum of which corresponds to the maximum correlation for a given point of the waveguide, according to step d). Representing the maximum correlation for a population of points along the measurement part of the waveguide allows the evolution of the value of the property along this part of the waveguide to be deduced therefrom.

The "stretching" and "DTW" methods are described, for example, in the publication entitled, "*A comparison of methods to estimate seismic phase delays: numerical examples for coda wave interferometry*", by T. Dylan Mikesell et al., in Geophysical Journal International (2015) 202-pages 347-360.

Furthermore, the waveguide of the device can comprise more than two conductors, for example, three, four, five or six conductors. The field lines of a signal circulating in the waveguide then depend on the arrangement of the conductors, which allows property variations to be measured in several different directions.

FIG. 8 illustrates various embodiments of a waveguide, and shows the associated field lines.

The distance between two conductors of a waveguide comprising more than two conductors can be variable depending on the considered pair of conductors. This distance can be easily fixed by threading the conductors through respective holes of beads.

For example, the waveguide can comprise a positively charged central conductor and two lateral conductors extending on each side of the central conductor and being negatively charged or grounded, or vice versa. The field lines are then concentrated between the central conductor and each of the lateral conductors.

In one embodiment, the waveguide comprises a positively charged central conductor and a plurality of lateral conductors extending parallel and around the central conductor, preferably being equi-angularly distributed around the central conductor and being negatively charged, preferably at the same electrical potential. Conversely, the central conductor can be negatively charged and the lateral conductors can be positively charged. The central conductor or the lateral conductors can be grounded.

A waveguide comprising a central conductor and six lateral conductors fully extending around the central conductor allows the lines to be concentrated in the immediate vicinity of the waveguide. This configuration allows the measurement region to be concentrated in the vicinity of the central conductor. The reliability of the local temperature measurement is improved, but the extent of the measurement region is limited. The waveguide can be a coaxial cable in order to obtain a maximum concentration of the measurement region, i.e., of the zone in which the device allows a measurement to be carried out.

Preferably, the conductors of the same waveguide are made of the same material.

The shape of the conductors is not limiting. In particular, they can assume the shape of a wire, a cable or a strip made of an electrically conductive material.

The blocks or the beads can be made of a single material or of several different materials. It is thus possible to adapt the impedance to the measurement medium in order to improve the measurement sensitivity relative to external disturbances.

The invention claimed is:

1. A device for monitoring a target component or a set of target components through electrical time-domain or frequency-domain reflectometry, said device comprising:
- an electromagnetic waveguide comprising an input end and an output end;
- an interrogator electrically connected to the input end of the electromagnetic waveguide and configured to inject an incident signal via said input end and to receive a signal reflected by the electromagnetic waveguide in response to said injection, the reflected signal comprising a back echo reflected by the output end of the electromagnetic waveguide;
- the electromagnetic waveguide comprising, between the input and output ends of said electromagnetic waveguide, a measurement part comprising more than 10 discontinuities, called "base discontinuities", per meter of electromagnetic waveguide, which are:
- randomly distributed at least along the measurement part of the electromagnetic waveguide; and are
- capable of generating echoes, called "base secondary echoes", with an amplitude of more than 1% and less than 30% of the amplitude of the back echo reflected by the output end of the electromagnetic waveguide,
- wherein the electromagnetic waveguide comprises:
- first and second electrical conductors that extend in the lengthwise direction of the electromagnetic waveguide; and
- one or more dielectric blocks disposed so as to generate said base secondary echoes.

2. The device as claimed in claim 1, wherein the one or more dielectric blocks is/are beads threaded onto the first electrical conductor and/or onto the second electrical conductor.

3. The device as claimed in claim 1, wherein the one or more dielectric blocks is/are movable relative to the first electrical conductor and/or to the second electrical conductor.

4. The device as claimed in claim 1, wherein the one or more dielectric blocks is/are disposed so as to together form a segmented protective sheath extending throughout the measurement part of the electromagnetic waveguide.

5. The device as claimed in claim 1, wherein the one or more dielectric blocks is/are made of a material selected from mica, mica derivatives, titanium, barium, mullite, cordierite and alumina.

6. The device as claimed in claim 1, with the electromagnetic waveguide being marked so as to identify the measurement part.

7. The device as claimed in claim 1, wherein the electromagnetic waveguide comprises two non-coaxial electrically conductive cables.

8. The device as claimed in claim 1, wherein the electromagnetic waveguide complies with the Rayleigh scattering condition.

9. The device as claimed in claim 1, wherein the outer surface of the electromagnetic waveguide and/or at least one electrical conductor of the electromagnetic waveguide is textured so as to generate said base discontinuities.

10. The device as claimed in claim 1, wherein the electromagnetic waveguide only comprises said base discontinuities in one or more "base" regions of the electromagnetic waveguide, with the cumulative length of the one or more base regions representing less than 90% of the length of the electromagnetic waveguide.

11. The device as claimed in claim 1, wherein the interrogator is configured so as to implement the following steps b1), b2), c1), c2), d'), and optionally e):

b1) injecting the incident signal via said input end at a "reference" instant;

c1) receiving a signal, also called "reference reflected signal", reflected by the electromagnetic waveguide in response to said injection;

b2) injecting the incident signal identical to that injected in step b1) via said input end at an "updated" instant;

c2) receiving a signal, also called "updated reflected signal", reflected by the electromagnetic waveguide in response to said injection;

d') analyzing the reference and updated reflected signals so as to determine said property of said environment in the updated situation;

e) transmitting a message relating to said property or to an evolution of said property relative to a situation prior to the updated instant.

12. The device as claimed in claim 11, wherein step d') comprises the following steps:

1) determining an intercorrelation function between:

a "reference" portion of the reference reflected signal; and an "updated" portion of the updated reflected signal;

with the reference and updated portions being portions of the reference and updated reflected signals, respectively, delimited by the same measurement window, centered on an instant, called "window position", defined relative to the start of the reference and updated reflected signals;

with the maximum of the intercorrelation function, or "maximum correlation", being obtained for a phase shift called "main phase shift";

2) determining, based on the main phase shift and/or the maximum correlation, a correlation index; and 3) determining, based on said correlation index, a value of said property in the updated situation and/or an evolution of said value of said property;

with the measurement window being selected so that at least some of the echoes of the reference and updated portions are said base secondary echoes.

13. The device as claimed in claim 12, wherein, in step d'), the measurement window and the position of the measurement window are determined so that more than 80% of the reference portion and more than 80% of the updated portion represent said base secondary echoes.

14. The device as claimed in claim 12, wherein, in step d'), the measurement window and the position of the measurement window are determined so that the base secondary echoes of the reference and updated portions have randomly variable amplitudes and/or shapes.

15. The device as claimed in claim 12, wherein, in step d'), the measurement window and the position of the measurement window are determined so that the base secondary echoes of the reference and updated portions are randomly distributed in the measurement window.

16. The device as claimed in claim 12, wherein the correlation index is a function of the ratio of the main phase shift to the position of the measurement window.

17. The device as claimed in claim 16, wherein the interrogator is configured to implement steps 1) and 2) for several successive positions of the measurement window so as to search for a portion of the reflected and reference signals in which said ratio evolves with the position of the measurement window.

18. The device as claimed in claim 17, wherein no position of the measurement window is less than one meter from the input end of the electromagnetic waveguide.

19. The device as claimed in claim 18, wherein no position of the measurement window is less than 5 meters from the input end of the electromagnetic waveguide.

20. The device as claimed in claim 12, wherein, in step 3) the value of said property and/or said evolution of said value of said property is determined by means of a correspondence table establishing a relationship between:

said value and/or said evolution; and said correlation index.

21. The device as claimed in claim 12, wherein the cycle of steps 1) to 3) is repeated by modifying the position of the measurement window each time.

22. The device as claimed in claim 12, wherein first and second cycles of steps 1) to 2) are carried out, with first and second positions of the measurement window, respectively, so as to determine first and second correlation indices, respectively; then in step 3), a difference is determined between the first and second correlation indices, or a function of said difference; then based on said difference or said function of said difference, the value of said property in the updated situation and/or the evolution of said value of said property is/are determined.

23. The device as claimed in claim 12, wherein the duration of the measurement window is greater than a reference period and is less than 6 reference periods, with the reference period being the period corresponding to the frequency of the highest peak of the frequency spectrum of the reference reflected signal.

24. The device as claimed in claim 11, wherein said base discontinuities are spaced apart from each other by a distance, measured along the electromagnetic waveguide, that is at least times less than the wavelength equal to the propagation speed of the incident signal divided by the frequency of the highest peak of the frequency spectrum of said incident signal.

25. The device as claimed in claim 1, wherein the electromagnetic waveguide comprises more than two of said conductors in the form of wires extending parallel to one another, with a first part of the conductors being connected, at the input end of the waveguide, the electromagnetic waveguide, to the interrogator so as to be at a first electrical potential; and with a second part of the conductors being connected, at the input end of the electromagnetic waveguide, to the interrogator so as to be at a second electrical potential.

26. A method for determining a property of an environment in an "updated" situation by means of a device as claimed in claim 11, said method comprising the following step:

a) introducing the electromagnetic waveguide into said environment; then in a reference situation of said environment, carrying out steps b1) and c1), in said updated situation, carrying out steps b2) and c2), step d') and optionally e).

27. The method as claimed in claim 26, wherein, in the updated situation and/or in the reference situation, said environment is at a temperature of more than 125° C. and the electromagnetic waveguide is configured so as not to melt, even partially, at the temperature of the environment.

28. The method as claimed in claim 27, wherein, in the updated situation and/or in the reference situation, said environment:

is at a temperature of more than 300° C. and the electromagnetic waveguide is configured so as not to melt, even partially, at the temperature of the environment; and/or is an atmosphere containing a halogen and/or an alkali and/or more than 1% or more than 5% of hydrogen and/or carbon monoxide.

29. The method as claimed in claim 26, wherein, in step a), the environment comprises a refractory material and/or is at a temperature of more than 400° C.

30. The method as claimed in claim 27, wherein said property is selected from among:

the temperature of the environment;

information relating to the physical state of the environment;

information relating to the chemical composition of the environment.

31. The method as claimed in claim 30, wherein the interrogator is configured so as to implement step d'), wherein step d') comprises the following steps:

1) determining an intercorrelation function between:

a "reference" portion of the reference reflected signal; and an "updated" portion of the updated reflected signal;

with the reference and updated portions being portions of the reference and updated reflected signals, respectively, delimited by the same measurement window, centered on an instant, called "window position", defined relative to the start of the reference and updated reflected signals;

with the maximum of the intercorrelation function, or "maximum correlation", being obtained for a phase shift called "main phase shift";

2) determining, based on the main phase shift and/or the maximum correlation, a correlation index; and 3) determining, based on said correlation index, a value of said property in the updated situation and/or an evolution of said value of said property;

with the measurement window being selected so that at least some of the echoes of the reference and updated portions are said base secondary echoes, and wherein:

said property acts on the propagation speed in the electromagnetic waveguide and is determined as a function of the main phase shift or a function of the main phase shift; and/or said property does not act on the propagation speed in the electromagnetic waveguide and is determined as a function of the maximum correlation.

32. An installation comprising:

a monitoring device as claimed in claim 1; and a target made up of the target component or of the set of target components, on which or in which target the measurement part of the electromagnetic waveguide is fixed.

33. The installation as claimed in claim 32, wherein the electromagnetic waveguide is disposed so as to be deformed under the effect of a modification of the shape of the target.

34. The installation as claimed in claim 33, wherein:

said deformation results from a modification of the position of the one or more dielectric blocks relative to the first electrical conductor and/or to the second electrical conductor; and/or said deformation results from the spacing of the first electrical conductor relative to the second electrical conductor.

35. The installation as claimed in claim 31, wherein the target component or the target component of the set of target components is selected from a group made up of:

a part of a heat exchanger;

a part of a solar absorber, a tile or a protective part of a combustion turbine chamber;

a tile of an incinerator;

a shell for protecting a heater tube of an incinerator;

a nozzle lining part;

a part of a refractory lining of a reactor for manufacturing carbon black;

a lining layer of a molten metal transfer ladle;

a part or a lining layer of a cement furnace, notably a rotary kiln;

a part or a lining layer of a gasifier, notably a coal gasifier, a petroleum coke gasifier, a biomass gasifier;

a part or a lining layer of a reformer, notably a methane reformer, a secondary reformer;

a furnace refractory block;

a layer of concrete or rammed refractory of a furnace lining;

a casting accessory part of molten metal or glass such as a plunger or washer, a nozzle or a slide plate, or a tundish, or a taphole runner or a trough cover, a curing support;

an abrasion protection part;

an abrasive;

a cutting tool;

a pump or hydraulic circuit element;

a filter for liquid or gaseous filtration;

a part of a glass furnace, selected from among the group consisting of a groove block or lintel, a tank block, a wall or side brick or block, a corner or angle block, a plate brick, a floor block or slab, an arch brick or support, a nozzle surround brick or block, a hole or launder brick, an electrode holder block, a glass furnace refractory spout piece, an injector block, a glass furnace groove;

a part of a metallurgical furnace, selected from among the group consisting of a tank block, a wall or side brick or block, a corner or angle block, a floor block or slab, an arch brick or support, a nozzle surround brick or block, a hole or launder brick, an electrode holder block, a tap hole block, a burner block, a muffle furnace block or tube, a protective tube of a thermocouple, a thermal plunger tube, a molten metal transport tube;

an electrolysis tank block for metal synthesis, in particular a tank side block;

a cathode or anode block of an electrolysis tank for metal synthesis;

a heat recovery tube, in particular a radiant tube;

a heating element protection tube.

36. The device as claimed in claim 1, wherein the electromagnetic waveguide is devoid of material having a melting temperature of less than 300° C.

37. A method for manufacturing a device for monitoring a target component or a set of target components through electrical time-domain or frequency-domain reflectometry, said device comprising:

an electromagnetic waveguide comprising an input end and an output end;

an interrogator electrically connected to the input end of the electromagnetic waveguide and configured to inject an incident signal via said input end and to receive a signal reflected by the electromagnetic waveguide in response to said injection, the reflected signal comprising a back echo reflected by the output end of the electromagnetic waveguide;

the electromagnetic waveguide comprising, between the input and output ends of said electromagnetic waveguide, a measurement part comprising more than 10 discontinuities, called "base discontinuities", per meter of electromagnetic waveguide, which are:

randomly distributed at least along the measurement part of the electromagnetic waveguide; and are capable of generating echoes, called "base secondary echoes", with an amplitude of more than 1% and less than 30% of the amplitude of the back echo reflected by the output end of the electromagnetic waveguide, wherein said electromagnetic waveguide is manufactured:

by disposing first and second electrical conductors parallel to each other; then by locally modifying the impedance of at least one of said electrical conductors by creating more than 10 base discontinuities per meter of electromagnetic waveguide, along the length of the electromagnetic waveguide, with the base discontinuities having random shapes and being randomly distributed, an input end of the electromagnetic waveguide being connected to said interrogator.

38. The method as claimed in claim 37, wherein the impedance is locally modified:

by locally modifying the relative position of the second electrical conductor relative to the first electrical conductor; and/or by disposing one or more dielectric blocks against at least one of said first and second electrical conductors; and/or by locally modifying the texture of the first electrical conductor and/or of the second electrical conductor and/or of a dielectric insulator disposed between said first and second electrical conductors.

39. The method as claimed in claim 37, wherein the impedance is locally modified by threading beads, which are identical or different, made of a dielectric material onto the first conductor and/or the second conductor.

40. A method for determining a property of an environment in an "updated" situation, said method comprising the following steps of:

a) introducing an electromagnetic waveguide into said environment comprising, between input and output ends of said electromagnetic waveguide, a measurement part comprising a more than 10 discontinuities, called "base discontinuities", per meter of electromagnetic waveguide, which are:

randomly distributed at least along the measurement part of the electromagnetic waveguide; and are capable of generating echoes, called "base secondary echoes", with an amplitude of more than 1% and less than 30% of the amplitude of a back echo reflected by the output end of the electromagnetic waveguide;

then in a reference situation of said environment:

b1) injecting an incident signal via said input end at a "reference" instant;

c1) receiving a signal, or "reference reflected signal", reflected by the electromagnetic waveguide in response to said injection; and in the updated situation of said environment:

b2) injecting the incident signal identical to that injected in step b1) via said input end at an "updated" instant;

c2) receiving a signal, or "updated reflected signal", reflected by the electromagnetic waveguide in response to said injection;

d) analyzing the reference and updated reflected signals so as to determine said property of said environment in the updated situation;

e) optionally, transmitting a message relating to said property or to an evolution of said property relative to a situation prior to the updated instant;

with step d) comprising the following steps:

1) determining an intercorrelation function between:

a "reference" portion of the reference reflected signal; and an "updated" portion of the updated reflected signal;

with the reference and updated portions being portions of the reference and updated reflected signals, respectively, delimited by the same measurement window, centered on an instant, called "window position", defined relative to the start of the reference and updated reflected signals;

with the maximum of the intercorrelation function, or "maximum correlation", being obtained for a phase shift called "main phase shift";

2) determining, based on the main phase shift and/or the maximum correlation, a correlation index; and 3) determining, based on said correlation index, a value of said property in the updated situation and/or an evolution of said value of said property;

said environment being, in the updated situation and/or in the reference situation, at a temperature of more than 125° C. and the electromagnetic waveguide being configured so as not to melt, even partially, at the temperature of the environment.

41. The method as claimed in claim 40, wherein, in the updated situation and/or in the reference situation, said environment:

is at a temperature of more than 300° C. and the electromagnetic waveguide is configured so as not to melt, even partially, at the temperature of the environment; and/or is an atmosphere containing a halogen and/or an alkali and/or more than 1% or more than 5% of hydrogen and/or carbon monoxide.

42. The method as claimed in claim 40, wherein, in step a), the environment comprises a refractory material and/or is at a temperature of more than 400° C.

* * * * *